United States Patent
Ichikawa et al.

(10) Patent No.: US 9,426,372 B2
(45) Date of Patent: Aug. 23, 2016

(54) IMAGING DEVICE AND IMAGING METHOD

(71) Applicant: OLYMPUS CORPORATION, Tokyo (JP)

(72) Inventors: Manabu Ichikawa, Hachioji (JP); Yoichiro Okumura, Hino (JP)

(73) Assignee: OLYMPUS CORPORATION (JP)

( * ) Notice: Subject to any disclaimer, the term of this patent is extended or adjusted under 35 U.S.C. 154(b) by 44 days.

(21) Appl. No.: 14/104,361

(22) Filed: Dec. 12, 2013

(65) Prior Publication Data
US 2014/0176775 A1  Jun. 26, 2014

(30) Foreign Application Priority Data
Dec. 21, 2012  (JP) ................................. 2012-279726

(51) Int. Cl.
| | |
|---|---|
| H04N 5/222 | (2006.01) |
| H04N 5/228 | (2006.01) |
| H04N 7/00 | (2011.01) |
| H04N 5/232 | (2006.01) |
| H04N 5/262 | (2006.01) |

(52) U.S. Cl.
CPC ......... *H04N 5/23293* (2013.01); *H04N 5/2624* (2013.01)

(58) Field of Classification Search
CPC .......................... H04N 5/23293; H04N 5/2624
USPC ............... 348/36, 220.1, 222.1, 330.1–330.3, 348/333.05, 333.12
See application file for complete search history.

(56) References Cited

U.S. PATENT DOCUMENTS

| | | | | |
|---|---|---|---|---|
| 2001/0024235 A1* | 9/2001 | Kinjo | ................. | H04N 1/32101 348/231.99 |
| 2006/0092269 A1* | 5/2006 | Baird | ................. | H04L 12/1822 348/14.08 |
| 2009/0009614 A1* | 1/2009 | Kawai | ................ | H04N 5/23248 348/208.12 |
| 2011/0129120 A1* | 6/2011 | Chan | ............................. | 382/103 |
| 2011/0234632 A1* | 9/2011 | Kubota | .................. | G09G 5/397 345/634 |

FOREIGN PATENT DOCUMENTS

| | | |
|---|---|---|
| JP | 2001-169150 | 6/2001 |
| JP | 2003-274263 | 9/2003 |

* cited by examiner

*Primary Examiner* — Trung Diep
(74) *Attorney, Agent, or Firm* — Volpe and Koenig, P.C.

(57) ABSTRACT

An imaging device, capable of shooting a combined photograph that is a single image made up of a plurality of images, and capable of live view display, comprises a first display section, a second display section, an imaging section for converting a subject image to image data, an image processing section for subjecting the image data to image processing, and a combined photograph processing section, for combining a plurality of image data subjected to image processing by the image processing section to create a single image, wherein, when a live view image is to be displayed on the first display section an image that has been subjected to processing by the combined photograph processing section is displayed, while when a live view image is to be displayed on the second display section an image that has been subjected to image processing by the image processing section is displayed.

9 Claims, 20 Drawing Sheets

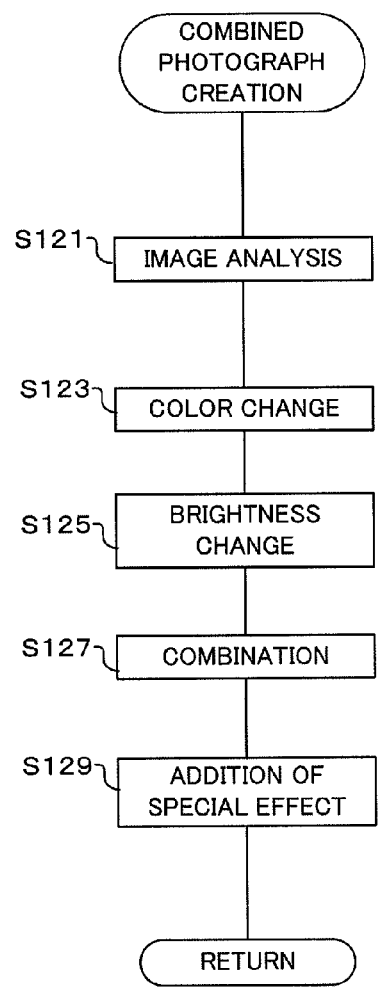

FIG. 8A
YCbCr HISTOGRAM
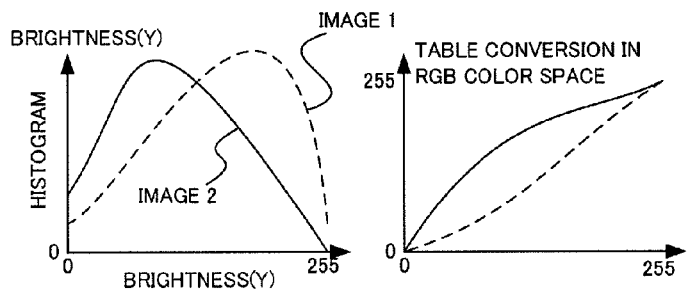
FIG. 8B
PROCESSING
FIG. 8C
HISTOGRAM AFTER CONVERSION
FIG. 8D
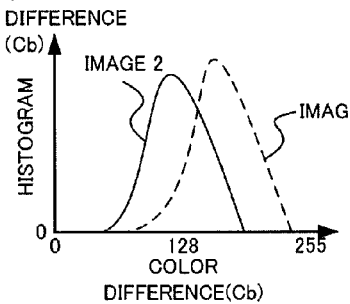
FIG. 8E
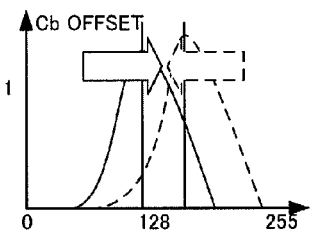
FIG. 8F
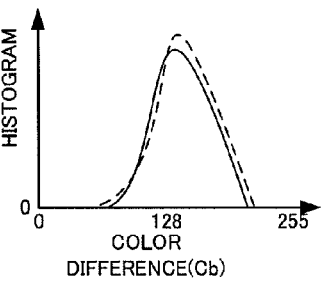
FIG. 8G
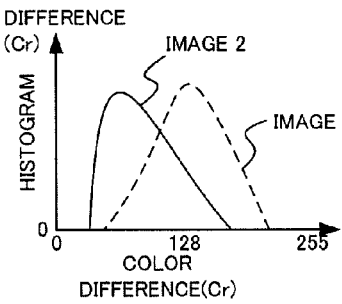
FIG. 8H
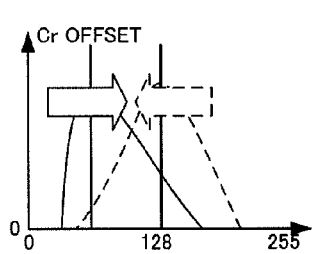
FIG. 8I
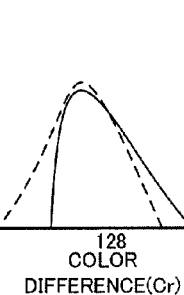

EVF DISPLAY

DISPLAY PANEL DISPLAY

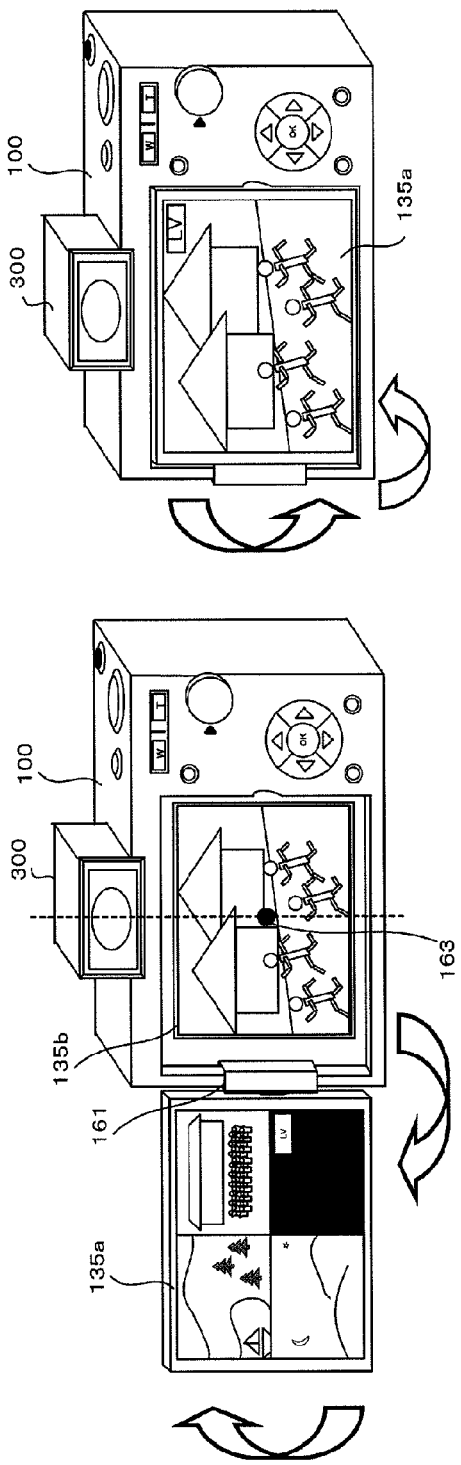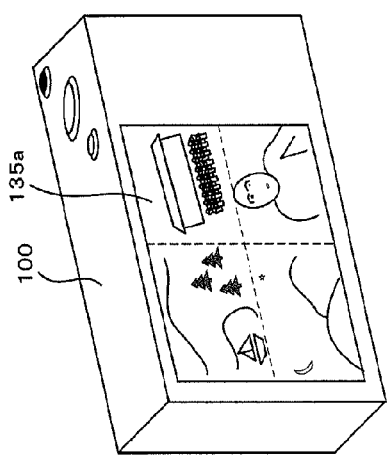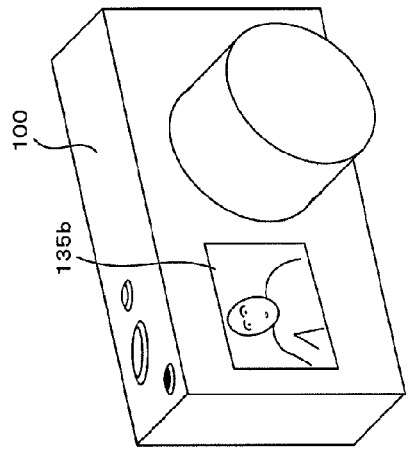

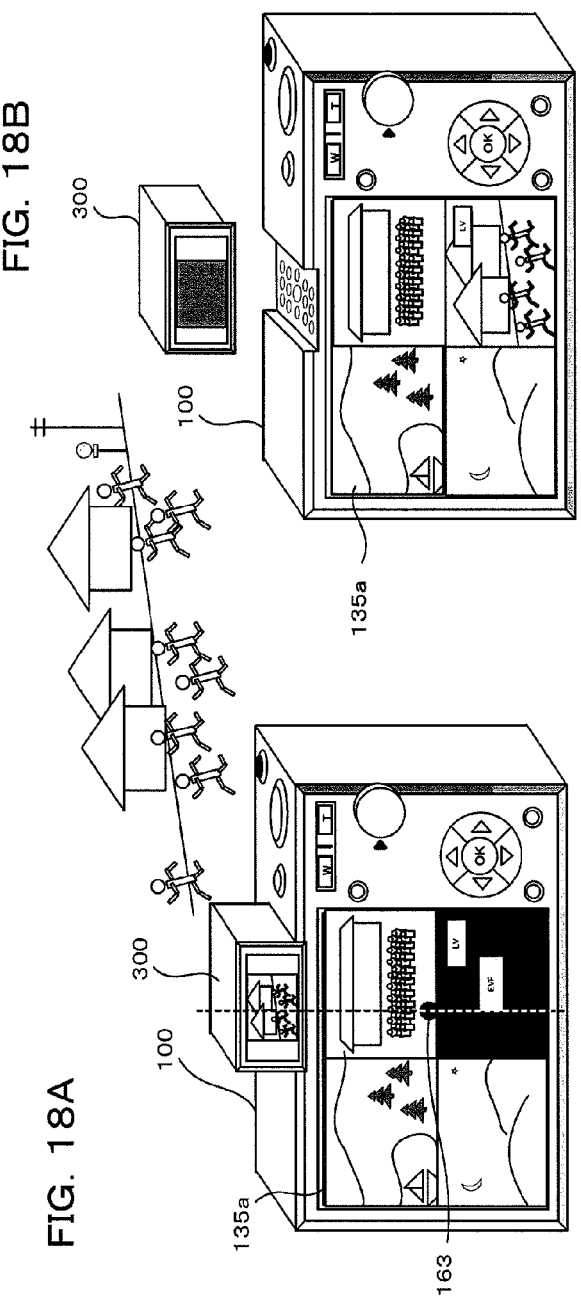
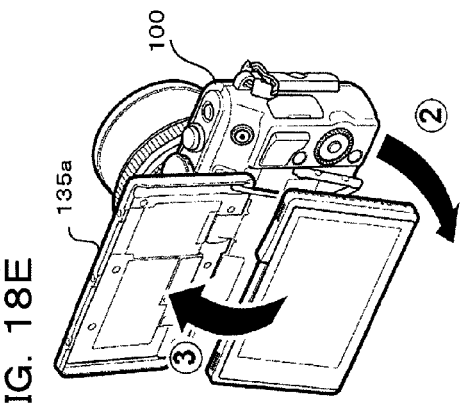
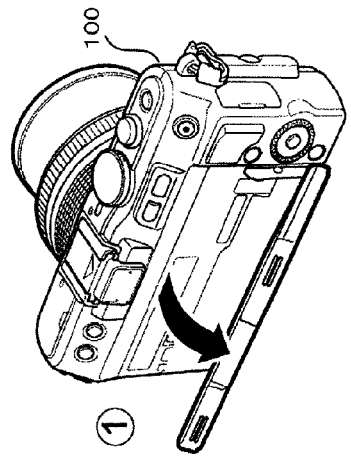
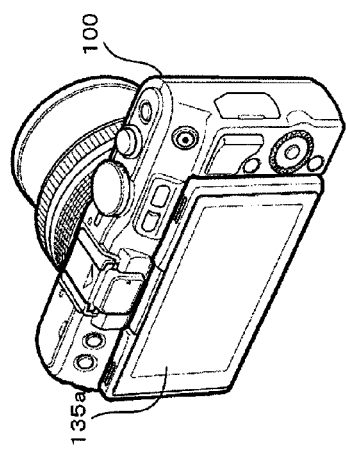

IMAGING DEVICE AND IMAGING METHOD

Benefit is claimed, under 35 U.S.C. §119, to the filing date of prior Japanese Patent Application No. 2012-279726 filed on Dec. 21, 2012. This application is expressly incorporated herein by reference. The scope of the present invention is not limited to any requirements of the specific embodiments described in the application.

BACKGROUND OF THE INVENTION

1. Field of the Invention

The present invention relates to an imaging device and an imaging method capable of generating an image such as a combined photograph made up of a plurality of photographs.

2. Description of the Related Art

An imaging device has been proposed with which, at the time of taking a combined photograph, it is possible to distinguish which frame of a combined photograph for display on a display section is a picture that has been taken, and which frame is a live view image (for example Japanese patent No. 461417), Japanese patent laid open No. 2001-169150. A "frame" means a single display region, a plurality of which a display section is divided up into.

SUMMARY OF THE INVENTION

An object of the present invention is to provide an imaging device and an imaging method that simply perform switching of display of a single frame and display of a combined photograph, so that it is easy to use at the time of shooting a combined photograph.

An imaging device of the present invention, that is capable of shooting a combined photograph that is single image made up of a plurality of images, and that is capable of live view display, comprises a first display section, a second display section that is different from the first display section, an imaging section for converting a subject image to image data and outputting the image data, an image processing section for subjecting the image data to image processing, and a combined photograph processing section, for combining a plurality of image data that have been subjected to image processing by the image processing section to create a single image, wherein, when a live view image is to be displayed on the first display section, an image that has been subjected to processing by the combined photograph processing section is displayed, while when a live view image is to be displayed on the second display section an image that has been subjected to image processing by the image processing section is displayed.

An imaging method of the present invention, for shooting a combined photograph that is single image made up of a plurality of images, and carrying out live view display, comprises converting a subject image to image data and outputting the image data, and, in the case where a live view image of one frame is to be displayed on a second display section, displaying an image acquired by subjecting the image data to image processing, and in the case where a combined photograph is to be displayed on a first display section that is different to the second display section, creating a single combined photograph by applying combined photograph processing to a plurality of image data that have been subjected to image processing and displaying this combined photograph.

BRIEF DESCRIPTION OF THE DRAWINGS

FIG. 7 is a flowchart showing operation of combined photograph creation of the camera of the first embodiment of the present invention.

FIG. 8A-FIG. 8I are drawings showing a modified example of image analysis, with the camera of the first embodiment of the present invention.

FIG. 17A-FIG. 17D are drawings showing one example of the external appearance of the camera of the second embodiment of the present invention.

FIG. 18A-FIG. 18E are drawings showing a modified example of the external appearance of the camera of the second embodiment of the present invention.

DETAILED DESCRIPTION OF THE PREFERRED EMBODIMENTS

Preferred embodiments using a camera to which an imaging device of the present invention has been applied will be described in the following in accordance with the drawings. The camera of the preferred embodiments of the present invention is a digital camera. This camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a shutter release operation image data is stored in a storage medium. Image data that has been stored in the storage medium can be played back and displayed on the display section if playback mode is selected.

A display section provided on the rear surface section or the like of the camera is capable of having a screen divided into a plurality of screens, and carrying out playback display of a combined photograph formed from a plurality of images. The combined photograph is displayed after being subjected to combined photograph processing so as to give a plurality of images a sense of unity. Also, this digital camera has an electronic viewfinder (EVF), and it is possible to display a live view image while the current imaging is in progress on this electronic viewfinder. A live view image is not subjected to combined photograph processing, and an image of a single frame that has been subjected to basic image processing is displayed. In this way, a camera of the preferred embodiments of the present invention is capable of shooting a combined photograph that is a single image made up of a plurality of images, and is capable of live view display.

Figure 1:
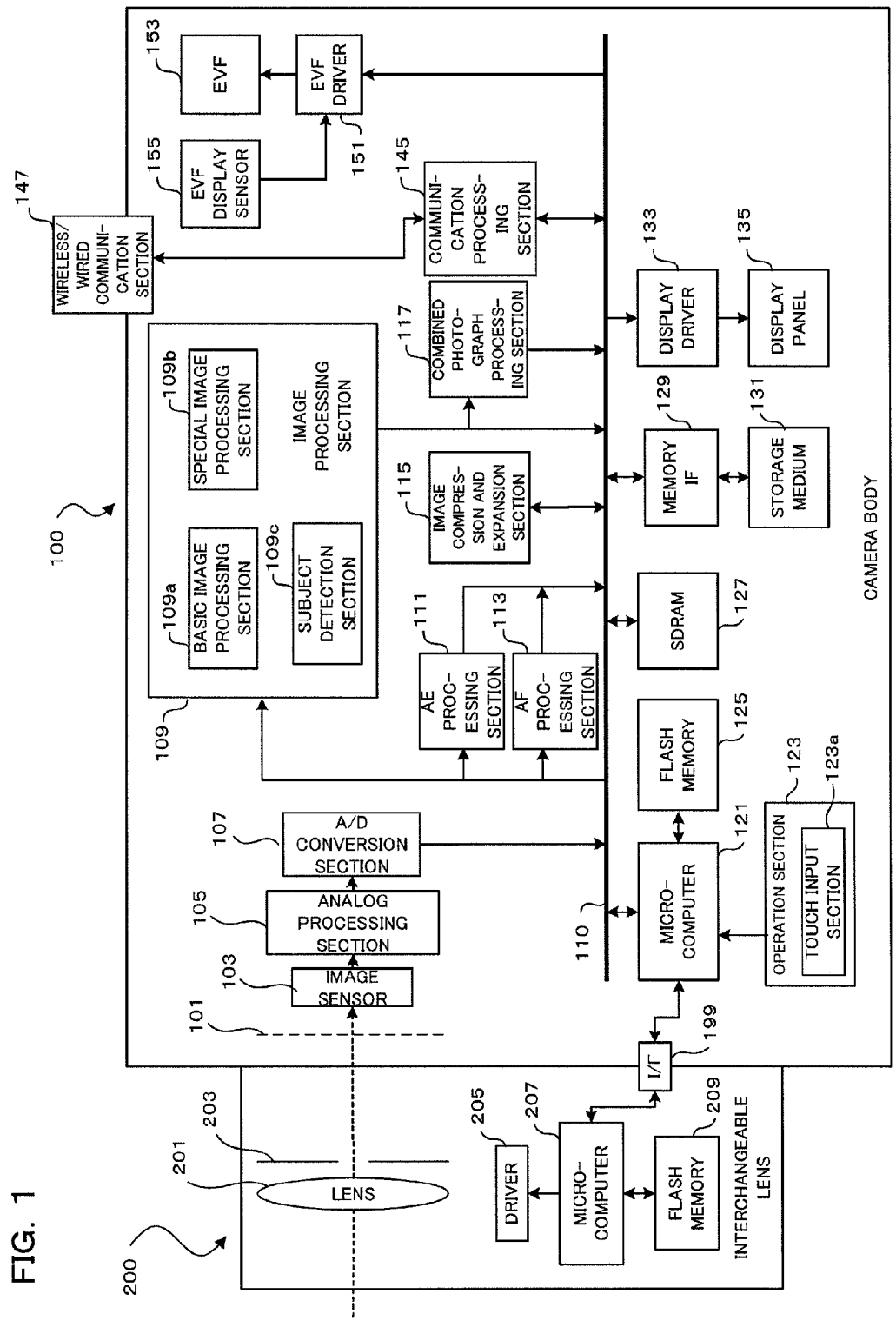
FIG. 1 is a block diagram mainly showing the electrical structure of a camera of a first embodiment of the present invention.

FIG. 1 is a block diagram mainly showing the electrical structure of a camera of a first embodiment of the present invention. This camera comprises a camera body 100 and an interchangeable lens 200 that can be attached to and removed from the camera body. With this embodiment, the photographing lens is an interchangeable lens, but this is not limiting, and it is also possible to have a digital camera of a type where a photographing lens is fixed to the camera body.

The interchangeable lens 200 is made up of a photographing lens 201, a diaphragm 203, a driver 205, a microcomputer 207 and a flash memory 209, and has an interface (hereafter referred to as I/F) 199 between the interchangeable lens 200 and the camera body 100, which will be described later.

The photographing lens 201 is constituted by a plurality of optical lenses for forming a subject image, and is a fixed focal length lens or a zoom lens. The diaphragm 203 is arranged to the rear on the optical axis of this photographing lens 201, and the diaphragm 203 has a variable aperture to control amount of subject light flux passing through the photographing lens 201. Also, the photographing lens 201 is capable of being moved in the optical axis direction by the driver 205, with focus position of the photographing lens 201 being controlled based on control signals from the microcomputer 207, and in the case where the photographing lens 201 is a zoom lens focal length is also controlled. The driver 205 also controls aperture of the diaphragm 203.

The microcomputer 207 that is connected to the driver 205 is connected to the I/F 199 and the flash memory 209. The microcomputer 207 operates in accordance with a program stored in the flash memory 209, to perform communication with a microcomputer 121 within the camera body 100, which will be described later, and performs control of the interchangeable lens 200 based on control signals from the microcomputer 121.

Besides the previously described program, various information, such as optical characteristics of the interchangeable lens 200 and adjustment values, are stored in the flash memory 209. The I/F 199 is an interface for carrying out communication between the microcomputer 207 inside the interchangeable lens 200 and the microcomputer 121 inside the camera body 100.

Inside the camera body 100, a mechanical shutter 101 is arranged on the optical axis of the photographing lens 201. This mechanical shutter 101 controls the time for which subject light flux passes, and a well-known focal plane shutter or the like is adopted. Behind this mechanical shutter 101, an image sensor 103 is arranged at a position where the subject image is formed by the photographing lens 201.

The image sensor 103 functions as an imaging section, and has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. A Bayer array RGB filter is arranged on the front surface of each pixel. The image sensor 103 also has an electronic shutter. This electronic shutter carries out control of exposure time by controlling the time from charge storage until charge readout of the image sensor 103. The image sensor 103 is not limited to a Bayer array, and a layered type such as Foveon (Registered trademark), for example, can also be used.

The image sensor 103 is connected to an analog processing section 105, and this analog processing section 105 performs wave shaping on the photoelectric conversion signals (analog image signals) that have been read out from the image sensor 103 after reducing reset noise etc., and also carries out gain increase so as to achieve an appropriate brightness.

This analog processing section 105 is connected to an A/D conversion section 107, and this A/D conversion section 107 performs analog to digital conversion on the analog image signals, and outputs the digital image signals (hereafter referred to as image data) to a bus 110. In this application, raw image data generated before image processing in the image processing section 109 is called RAW data.

The bus 110 is a transfer path for transferring various data, that has been read out or generated inside the camera body 100, within the camera body 100. Besides the previously described A/D conversion section 107, an image processing section 109, AE (Auto Exposure) processing section 111, AF (Auto Focus) processing section 113, image compression and expansion section 115, combined photograph processing section 117, the microcomputer 121, an SDRAM (synchronous DRAM) 127, memory interface (hereafter referred to as memory I/F) 129, display driver 133, communication processing section 145, and EVF driver 151 are connected to the bus 110.

The image processing section 109 has a basic image processing section 109a for carrying out basic image processing, a special image processing section 109b for applying special effects in the case where art filter has been set, and a subject detection section 109c for detecting a subject.

The basic image processing section 109a functions as an image processing section for performing image processing of image data that has been formed by the imaging section, and performs optical black (OB) subtraction processing, white balance (WB) correction, demosaicing processing that is carried out in the case of Bayer data, color reproduction processing, gamma correction processing, color matrix computation, noise reduction (NR) processing, edge enhancement processing etc. on RAW data. In a single exposure, and if art filter has not been set, image processing is completed with only processing by this basic image processing section 109a.

Also, the special image processing section 109b applies various special effects to an image that has been processed by the basic image processing section, such as a pin hole effect to lower peripheral brightness, a soft focus effect to combine an original image with an image that has been blurred, a noise effect to combine with a noise image, a cross filter effect to draw cross patterns on bright points, a miniature effect to blur peripheral portions etc., in accordance with a special effect (art filter) that has been set.

The subject detection section 109c detects a subject such as a person's face or a pet, by analysis of an image using pattern matching etc. In the event that it is possible to detect a subject, information such as the type, size, position and reliability etc. of the subject within an image is acquired.

The AE processing section 111 measures subject brightness based on image data that has been input via the bus 110, and outputs this subject brightness information to the microcomputer 121 via the bus 110. A dedicated photometric sensor for subject brightness measurement may be provided, but in this embodiment subject brightness is calculated based on image data.

The AF processing section 113 extracts signals for high frequency components from image data, acquires a focus evaluation value using integration processing, and outputs the focus evaluation value via the bus 110 to the microcomputer 121. In this embodiment, focusing of the photographing lens 201 is carried out using the so-called contrast method. With this embodiment AF control using a contrast method is given as an example, but it is also possible to carry out focusing by AF control using phase difference AF, where subject light flux is divided and phase difference sensors are provided on the optical paths, or a phase difference sensor is provided on an image sensor.

At the time of storage of image data to the storage medium 131, the image compression and expansion section 115 subjects image data that has been read out from the SDRAM 127 to compression in accordance with various compression formats such as JPEG compression in the case of a still picture or MPEG in the case of a movie. The microcomputer 121 attaches a header necessary for configuring a JPEG file or an MPO (Multi Picture Object: image format used with 3D stereovision etc.) file or MPEG file to the JPEG image data or MPEG image data, to create a JPEG file or an MPO file or MPEG file, and stores the created file in the storage medium 131 via the memory I/F 129.

The image compression and expansion section 115 also carries out expansion of JPEG image data and MPEG image data for image playback display. In the expansion, a file that is stored in the storage medium 131 is read out, and after being subjected to expansion processing in the image compression and expansion section 115 the expanded image data is temporarily stored in the SDRAM 127. With this embodiment, the JPEG compression system and MPEG compression system are adopted as the image compression system, but the compression system is not limited to this and another compression systems may be used, such as TIFF, H.264 etc.

The combined photograph processing section 117 carries out processing in order to create a single image (combined photograph) by combining a plurality of image data. In combining images, a template is read out from flash memory 125, and brightness change is carried out using gamma correction within the basic image processing section 109a so that brightness of the images becomes the same. Also, WB is changed using color reproduction processing within the basic image processing section 109a, in order to unify the overall white balance (WB). Also, a special effect such as a pinhole effect is applied after combination using the special image processing section 109b, and correction etc. of an incorporation image and a replacement image is carried out.

The microcomputer 121 provides a function as a control section for this entire camera, and performs overall control of various sequences of the camera. Besides the previously described I/F 199 an operation section 123 and a flash memory 125 are connected to the microcomputer 121.

The operation section 123 includes operation members such as various input buttons, like a power supply button, shutter release button (hereafter referred to as release button), a movie button, playback button, menu button, cross-shaped key, OK button, delete button, magnification button, and various input keys, and detects operating states of these operation members and outputs the result of detection to the microcomputer 121. The microcomputer 121 executes various sequences according to user operation based on the result of detection of the operation members from the operation section 123. The power supply button is an operation member for instructing to turn a power supply of the digital camera on or off. If the power supply button is pressed, the power supply of the digital camera is turned on, and if the power supply button is pressed once again the power supply of the digital camera is turned off.

The release button is made up of a first release switch that turns on when the button is pressed down half way, and a second release switch that is turned on when the button is pressed down further from the half-pressed state to be pressed down fully. The microcomputer 121 executes shooting preparation sequences such as an AE operation and AF operation if the first release switch is turned on. Also, if the second release switch is turned on shooting is carried out by executing a series of shooting sequences to control the mechanical shutter 101 etc., acquire image data based on a subject image from the image sensor 103 etc., and store this image data in the storage medium 131.

The movie button is an operation button for designating start or finish of movie shooting, and if the movie button is initially operated movie shooting commences, and movie shooting finishes when it is operated again. The playback button is an operation button for setting and canceling playback mode settings, and if playback mode is set image data of a taken image is read out from the storage medium 131, and a taken image is playback displayed on the display panel 135. The delete button is an operation button for designating and deleting an image in cases such as where playback images are displayed as a list, or a combined photograph is being displayed, for example. The magnification button is an operation button for enlarging a display image at the time of playback display.

The menu button is an operation button for causing display of menu screens on the display panel 135. It is possible to carry out the various camera settings on the menu screens. As camera settings there are shooting mode settings such as normal shooting mode and combined photograph, for example, and finish settings such as natural, vivid, flat, portrait, art filter etc. As art filters there are pop art, toy photo, fantastic focus, rough monochrome, Diorama, Crystal etc. It is also possible to have various settings, such as style of a combined photograph (template), selection of the replacement image for a combined photograph, and whether or not an image before editing will be stored at the time of editing a combined photograph. In the case of a combined photograph, display of a live view (LV) image is updated in accordance with a style (template) and incorporation image selection state (refer to S47 in FIG. 3).

A touch input section 123a is also provided in the operation section 123. The display panel 135 is capable of touch operation, and the touch input section 123a detects a position that has been touched by a user etc. and outputs to the microcomputer 121.

The flash memory 125 stores a program for executing the various sequences of the microcomputer 121. The microcomputer 121 carries out overall control of the camera based on this program.

The SDRAM 127 is an electrically rewritable volatile memory for temporary storage of image data etc. This SDRAM 127 temporarily stores image data that has been output from the A/D conversion section 107, and image data that has been processed in the image processing section 109, image compression and expansion section 115 and combined photograph processing section 117 etc.

The memory I/F 129 is connected to the storage medium 131, and carries out control for reading and writing of data, such as image data and headers attached to image data, to and from the storage medium 131. The storage medium 131 is a storage medium such as a memory card that can be loaded into and taken out of the camera body 100, but this is not limiting and it may also be a hard disk or the like built into the camera body 100.

The display driver 133 is connected to the display panel 135, and reads out from the SDRAM 127 and storage medium 131 to display an image on the display panel 1355 based on image data that has been expanded by the image compression and expansion section 115. The display panel 135 is arranged on a rear surface of the camera body 100, and carries out image display. The display panel 135 is arranged on a display surface of an external section of the camera, such as the rear surface, which makes it a display section that is prone to the effects of external light, but it is possible to install a large-sized display panel. As a display section it is possible to adopt various display panels such as a liquid crystal display panel (LCD), TFT), or organic EL etc.

As image display modes of the display panel 135, there are Quickview Display for displaying image data to be stored for only a short time immediately after being taken, playback display of image files for still images and movies that have been stored in the storage medium 131, and movie display such as live view display. It is also possible to display a combined photograph that has been subjected to combined photograph processing in the combined photograph processing section 117.

The communication processing section 145 is connected to a wireless/wired communication section 147. The communication processing section 145 and wireless/wired communication section 147 carryout communication with external sections by means of wired communications such as USB or LAN, and wireless communication etc., and updates and adds templates for division of combined photographs that are stored within the flash memory 125. Also, a live view image (a single frame or combined image) is transmitted to a display section of an external section such as a smart phone or television.

An EVF driver 151 is connected to the EVF 153, and reads out from the SDRAM 127 and storage medium 131 to display an image on the EVF 153 based on image data that has been expanded by the image compression and expansion section 115. The EVF 153 is a viewfinder for observing an image displayed on a small liquid crystal panel etc. by means of the eyepiece. Since the EVF 153 is viewed by means of an eyepiece, it is a display section that is not likely to be affected by external light. As image display live view display at the time of shooting is possible, and besides this Quickview display and playback display of image files for still images or movies are also carried out.

This embodiment has two display sections, namely a display panel and an EVF. In order to make the description clear, the display panel 135 will be described as a first display section, and the EVF 153 will be described as a second display section. As the second display section, besides the EVF 153, it is possible to have a display panel provided on a front surface side of the camera body, or a display panel provided inside a panel that can be opened and closed.

An EVF display sensor 155 is a sensor for determining whether or not display is to be carried out on the EVF 153. As the EVF display sensor 155, specifically, a sensor that outputs a detection signal if the photographer's eye is close to the eyepiece is adopted. The second display section is not limited to the EVF 153 as described above, and it is possible to have, for example, a display panel on the front surface on the body or a display panel of an open and closed type (refer to FIG. 17A and FIG. 17A, which will be described later). In the case of a body front surface display panel an on off switch or the like is preferably used as the EVF display sensor 155, while in the case of an open or closed type display panel it is preferable to use an open or closed detection element such as a hall element. If the switch is on, in the case of an on/off switch, or if an element is in an open state, in the case of an open or closed detection element, display should be carried out on the second display section such as the EVF 153 or a display panel provided on the front surface of the camera body or a display panel provided inside a panel that can be opened and closed. During EVF display the display panel 135 preferable does not perform display.

Next, main processing of the camera of this embodiment will be described using the flowcharts shown in FIG. 2 and FIG. 3. The flowcharts shown in FIG. 2-FIG. 7, FIG. 9-FIG. 12, and FIG. 15, which will be described later, are executed by the microcomputer 121 controlling each section in accordance with programs stored in the flash memory 125.

Figure 2:
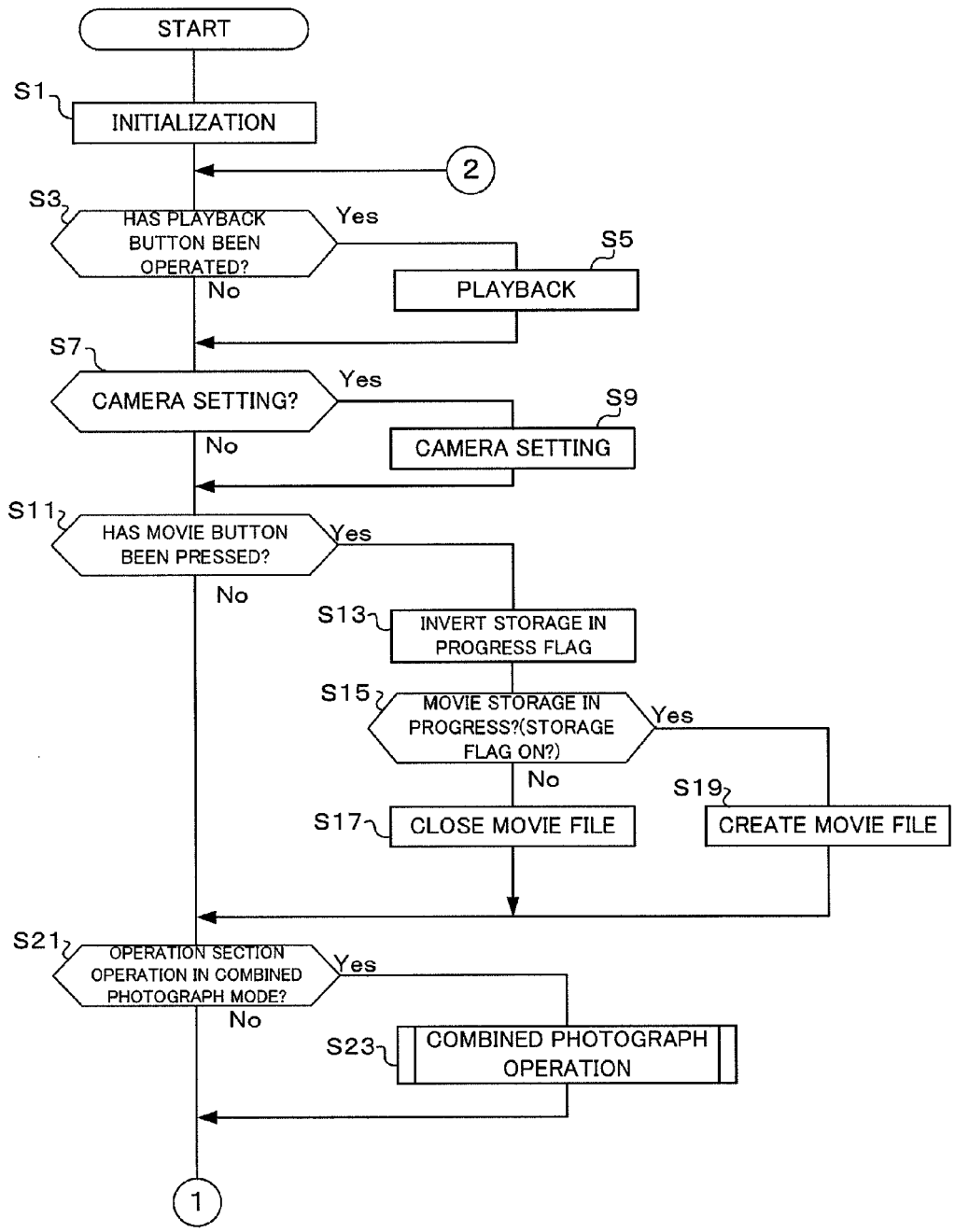
FIG. 2 is a flowchart showing main operation of the camera of the first embodiment of the present invention.
Figure 3:
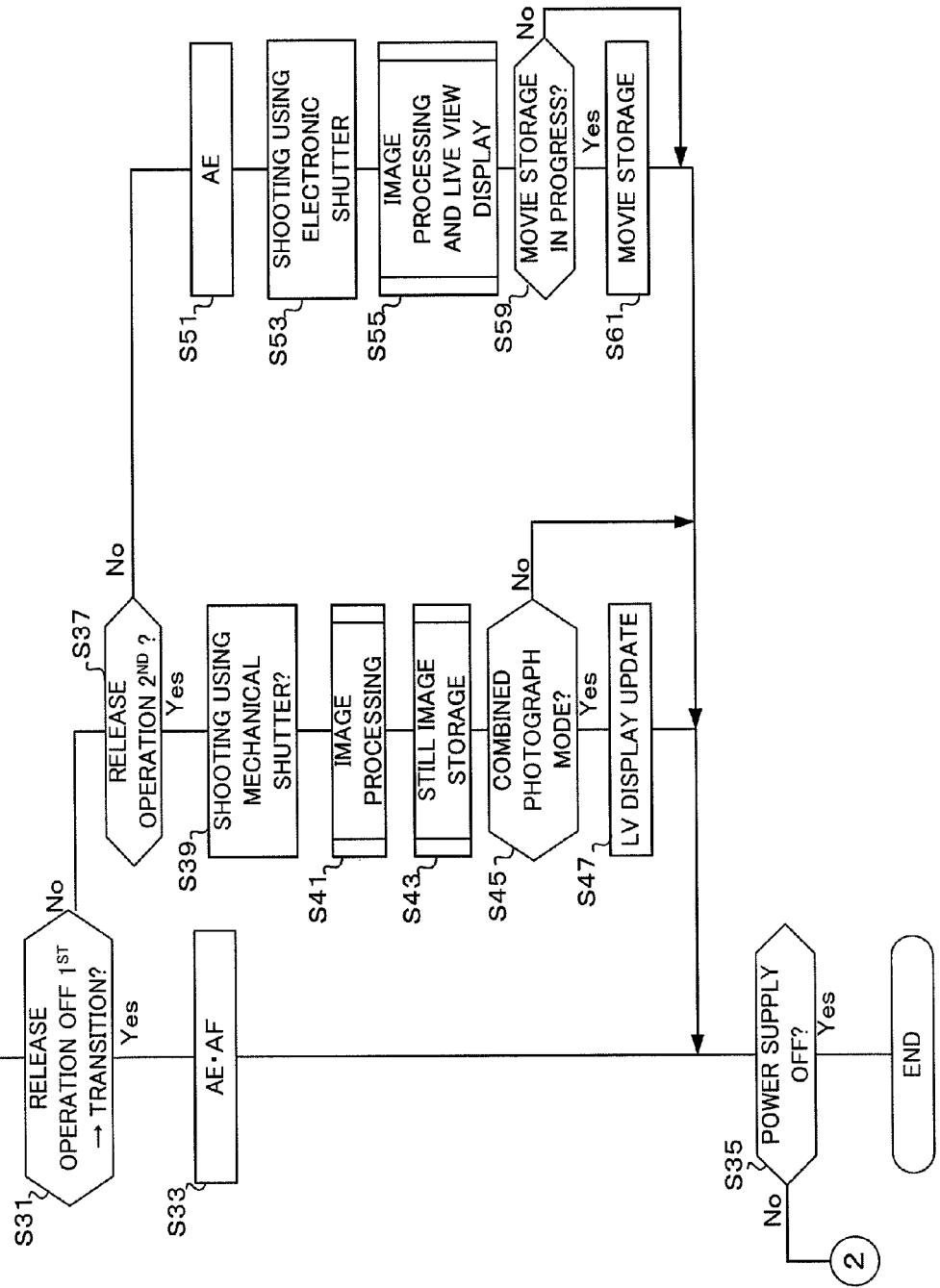
FIG. 3 is a flowchart showing main operation of the camera of the first embodiment of the present invention.

If the power supply button within the operation section 123 is operated and the power supply is turned on, the microcomputer 121 commences operation in accordance with the main flow shown in FIG. 2. If the microcomputer 121 commences operation, first of all initialization is carried out (S1). As part of the initialization, mechanical initialization and electrical initialization, such as initialization of various flags etc., are carried out. As one of the various flags, a storage in progress flag indicating whether or not movie storage is in progress is reset to off (refer to Steps S13 and S15).

Once initialization has been carried out, it is next determined whether or not the playback button has been pressed (S3). Here, determination is carried out by detecting the operating state of the playback button within the operation section 123. If the result of this determination is that the playback button has been pressed, playback is executed (S5). Here, image data is read out from the storage medium 131, and a table of still images and movies is displayed on the LCD 135. The user selects an image from within the table by operating the cross-shaped key and decides on the image using the OK button. Editing of a combined photograph can also be carried out in this step.

If playback is executed in step S5, or if the result of determination in step S3 was that the playback button had not been pressed, it is determined whether or not camera setting will be carried out (S7). When the menu button within the operation section 123 has been operated, camera setting is carried out on a menu screen. In this step therefore, determination is based on whether or not this camera setting has been carried out.

If the result of determination in step S7 is camera setting, camera setting is carried out (S9). As described previously, it is possible to carry out various camera settings on the menu screens. As camera settings there are shooting mode settings such as normal shooting mode and combined photograph, for example, and picture modes such as natural, vivid, flat, portrait, art filter etc. As art effect settings there are pop art, toy photo, fantastic focus, rough monochrome, Diorama, Crystal etc. Various settings are also possible, such as style (template) of a combined photograph, selection of a replacement image for a combined photograph, whether or not an image before editing will be stored at the time of combined photograph editing, selection of an image for embedding an already stored image in a specified frame of a combined photograph, etc.

If camera setting has been carried out in step S9, or if the result of determination in step S7 was not camera setting, it is next determined whether or not the movie button has been pressed (S11). Here the microcomputer 121 carries out determination based on operating state of the movie button input from the operation section 123.

If the result of determination in step S11 is that the movie button has been pressed, the storage in progress flag is determined (S13). The storage in progress flag is set to on (1) if movie shooting is progress, or set to off (0) if a movie is not being shot. In this step the flag is inverted, that is, if it is set to on (1) it is inverted to off (0), and if it is set to off (0) it is inverted to on (1).

Once inversion of the storage in progress flag has been carried out in step S13, it is next determined whether or not storage of a movie is in progress (S15). Here, determination is based on whether the storage in progress flag, which was inverted in step S13, is set to on or set to off.

If the result of determination in step S15 is that movie storage is in progress, a movie file is created (S19). Movie storage is carried out in step S61, which will be described later, but in this step a movie file for movie storage is created, and preparation so as to be able to store image data of the movie is performed.

On the other hand, if the result of determination is that movie storage is not in progress, the movie file is closed (S17). The movie file is closed in this step because the movie button has been pressed and movie shooting is completed. When closing the movie file, the movie file is placed in a state of being capable of being played back by storing a number of frames in a header of the movie file etc., and file writing is completed.

Once the movie file has been closed in step S17, or if a movie file is created in step S19, or if the result of determination in step S11 was that the movie button was not pressed, it is next determined whether or not the operation section has been operated in combined photograph mode (S21). As described previously, setting of combined photograph mode is possible in the camera settings of step S9. In this step it is determined whether or not an operating section of the operation section 123 was operated in a state where this combined photograph mode is set.

If the result of determination in step S21 is that an operating section has been operated in combined photograph mode, a combined photograph operation is executed (S23). With this combined photograph operation, various operations for carrying out editing of the combined photograph, for example, shooting frame update, cancel operation, restoration operation, temporary save operation, temporary save and write operation, etc. are carried out. Detailed operation of this combined photograph operation will be described later using FIG. 10 and FIG. 11.

If the microcomputer 121 has executed a combined photograph operation in step S23, or if the result of determination in step S21 was that an operating section was not operated in combined photograph mode, it is determined whether or not the release button has been pressed down halfway, in other words, whether or not the first release switch has transitioned from off to on (S31). For this determination, the state of the first release switch that is linked to the release button is detected by the operation section 123, and determination is carried out based on the result of detection. If the result of detection is that the first release switch has changed from off to on, the result of determination becomes Yes, while on the other hand if an on state or an off state is maintained the result of determination becomes No.

If the result of determination in step S31 is that the release button has been pressed down halfway, then in the case where the first release has transitioned from off, an AE/AF operation is executed (S33). Here, the AE processing section 111 detects subject brightness based on image data acquired by the image sensor 103, and calculates shutter speed and aperture value etc. for correct exposure based on this subject brightness.

Also, an AF operation is carried out in step S33. Here, the driver 205 moves focus position of the photographing lens 201 by means of the microcomputer 207 inside the interchangeable lens 200, so that a focus evaluation value that has been acquired by the AF processing section 113 becomes a peak value. As a result, if the release button is pressed down halfway when movie shooting is not being carried out, focusing of the photographing lens 201 is carried out at that point in time. After that processing advances to step S35.

If the result of determination in step S31 is that the release button has not transitioned from off to the first release, it is next determined whether or not the release button has been pressed down fully, and the second release switch has been turned on (S37). In this step, the state of the second release switch that is linked to the release button is detected by the operation section 123, and determination is carried out based on the result of detection.

If the result of determination in step S37 is that the release button is pressed down fully and that the second release which has been turned on, still image shooting is carried out using the mechanical shutter (S39). Here, the diaphragm 203 is controlled with the aperture value that was calculated in step S33, and the shutter speed of the mechanical shutter 101 is controlled with the calculated shutter speed. Then, once the exposure time corresponding to the shutter speed has elapsed, image signals are read from the image sensor 103, and RAW data that has been processed by the analog processing section 105 and the A/D conversion section 107 is output to the bus 110.

Once the microcomputer 121 has carried out shooting using the mechanical shutter, image processing is carried out (S41). Here, RAW data that has been acquired by the image sensor 103 as a result of shooting using the mechanical shutter is read out, and image processing is carried out by the image processing section 109. Detailed operation of this image processing will be described later using FIG. 4.

Once the microcomputer 121 has carried out image processing, still image storage is carried out (S43). Here, image data for a still picture to which image processing has been applied is stored in the storage medium 131. In the case of having shot with a combined photograph, then in the event that it is desired to cancel (delete) part of an image within the combined photograph, it is possible to delete using a cancel operation. Detailed operation of this still picture storage will be described later using FIG. 9.

Once the microcomputer 121 has carried out still picture storage, it is next determined whether or not combined photograph mode has been set (S45). As described previously, combined photograph mode is set on a menu screen etc., and in this step whether or not this combined photograph mode has been set is determined.

If the result of determination in step S45 is that combined photograph mode has been set, update to live view (LV) display is carried out (S47). If combined photograph mode has been set, live view display is updated in accordance with a style (template) and a number of images. In a case where live view display is carried out all the time for all frames, live view display is carried out at parts other than where there are already taken and confirmed images. Also, in the case of live view display one frame at a time, live view display is switched in order from a taken frame to the next frame (for example, in the order upper left→upper right→lower left→lower right). In either case, taken frames display taken images. It is also possible to display so as to know which are already taken images and which is live view display, using OSD (on-screen display), and it is also possible for already taken images to be displayed so as to know the order in which they were taken. After that processing advances to step S35.

If the result of determination in step S37 was not release operation 2nd, AE is next carried out (S51). In the case where S27 is passed through from previously described step S21, it is a situation where no operation was carried out for the release button, and in this case live view display of step S57, which will described later, is carried out. In step S51, exposure control is carried out in order to carry out live view display. Specifically, shutter speed and ISO sensitivity for the electronic shutter of the image sensor 103 in order to carry out live view display at the correct exposure are calculated.

Once the microcomputer 121 has carried out AE, shooting using the electronic shutter is carried out (S41). Here, the subject image is converted to image data. Specifically, charge storage is performed during an exposure time that is determined by the electronic shutter of the image sensor 103, and image data is acquired by reading out the stored charge once the exposure time has elapsed.

Once the microcomputer 121 has carried out shooting using the electronic shutter, image processing and live view display are carried out on the acquired image data (S55). The image processing here is for live view display, and is basic image processing carried out by the basic image processing section 109a. Also, in the case where a special effect such as art filter has been set, special image processing may also be carried out in accordance with the setting. Image processing for display on the display panel 135 and image processing for display on the EVF 153 are different. Details of the differences will be described later, but image processing for display on the display panel 135 only performs basic image processing (refer to S233 in FIG. 1), while image processing for display on the EVF 153 involves also carrying out special image processing and image processing for combined photograph creation, in addition to the basic image processing (refer to S227 in FIG. 12, and FIG. 4).

Once the microcomputer 121 has carried out image processing, live view display is carried out on the display panel 135 or EVF 153. Image data is acquired in step S53, and image processing is carried out, and so update of the live view display is carried out using an image that has been subjected to this processing. A photographer can determine composition and shutter speed by observing the live view display.

At the time of live view display, live view is carried out for one frame on the EVF 153. Specifically, a live view image of one frame that has been subjected to basic image processing is displayed (this live view image of one frame will hereafter be referred to as "single frame live view display"). In the case where combined photograph mode has been set, an image for a combined photograph is displayed on the display panel 135. At this time, in a case where all of the plurality of images constituting a combined photograph have not been fixed, a live view image of a single frame within those images is displayed (hereafter, live view display when combined photograph mode is set will be referred to as "combined photograph live view display"). In the case where combined photograph mode has not been set, a live view image for a single frame is displayed on the display panel 135, the same as for the EVF 153. Detailed operation of the image processing and live view display will be described later using FIG. 12.

Once the microcomputer 121 has carried out image processing and live view display in step S55, it is determined whether or not movie storage is in progress (S59). Here it is determined whether or not the storage in progress flag is on. If the result of this determination is that movie storage is in progress, movie storage is carried out (S61). Here, image data read out from the image sensor 103 is image processed to image data for a movie, and stored in the storage medium 131 as a movie file. After that processing advances to step S35.

In step S35 the microcomputer 121 determines whether or not to power off. In this step it is determined whether or not the power supply button of the operation section 123 has been pressed again. If the result of this determination is not power off, processing returns to step S3. On the other hand, if the result of determination is power off, a termination operation of the main flow is executed and then the main flow is terminated.

In this way, with the first embodiment of the present invention, setting of combined photograph mode is possible (S9), and at the time of live view display when combined photograph mode is set, single frame live view image is displayed on the EVF 153 and a combined photograph is displayed on the display panel 135 (S55).

Next, the image processing of step S41 will be described using the flowchart shown in FIG. 4. If the microcomputer 121 enters the image processing flow basic image processing is first carried out (S71). Here, the basic image processing section 109a applies optical black (OB) subtraction, white balance (WB) correction, demosaicing processing, color reproduction processing, brightness change processing, edge enhancement processing, noise removal (NR) processing etc. to image data that has been read out from the image sensor 103 and subjected to AD conversion by the A/D conversion section 107. Detailed operation of this basic image processing will be described later using FIG. 5A and FIG. 5B.

If the microcomputer 121 carries out basic image processing, it is next determined whether or not art filter has been set (S73). An art filter is set in the previously described camera setting (S9), and so in this step it is determined whether or not an art filter has been set.

If the result of determination in step S73 is that an art filter has been set, special image processing is carried out (S75). Here, special image processing is applied in accordance with the type of art filter that has been set. Detailed operation of this special image processing will be described later using FIG. 6.

If special image processing has been carried out by the microcomputer 121, or if the result of determination in step S73 is that an art filter has not been set, it is next determined whether or not it is a combined photograph (S77). As described previously, combined photograph mode is set on a menu screen.

If the result of this determination is that combined photograph mode has been set, combined photograph creation is carried out by the microcomputer 121 (S79). With this combined photograph creation, preprocessing such as resizing and rotation is carried out by the combined photograph processing section 117, and after carrying out color change and brightness change image combination is carried out in accordance with a style (template), to create a combined photograph. During movie shooting the combined photograph function may be turned off. Using combined photograph processing, although there are a plurality of images it is possible to create a single photograph that has a feeling of unity overall. Detailed operation of this combined photograph creation will be described later using FIG. 7.

If the microcomputer 121 has carried out combined photograph creation, or if the result of determination in step S77 is that combined photograph mode has not been set, the originating processing flow is returned to.

In this way, with the image processing of this embodiment, after carrying out basic image processing and carrying out special image processing as required, combined photograph creation is carried out if combined photograph mode has been set.

Next, detailed operation of the basic image processing in step S71 (FIG. 4) will be described using the flowchart shown in FIG. 5A. If the basic image processing flow is entered, the microcomputer 121 first carries out optical black (OB) calculation (S81). In this step, an optical black value, which is ascribable to dark current etc. of the image sensor 103, is respectively subtracted from a pixel value of each pixel constituting the image data by an OB calculation section within the basic image processing section 109a.

Once OB calculation has been carried out, the microcomputer 121 carries out white balance (WB) correction (S83). In this step WB correction is carried out on image data by the WB correction section within the basic image processing section 109a, in accordance with a white balance mode that has been set in advance. Specifically, correction is carried out by reading out R gain and B gain corresponding to the white balance mode that has been set by the user from the flash memory 125 of the camera body, and multiplying the image data of the Bayer array by these values. Alternatively, in the case of auto white balance, R gain and B gain are calculated from RAW data, and correction is carried out using these values.

Next, the microcomputer 121 carries out demosaicing processing (S85). In this step, image data that has been subjected to white balance correction is converted to data having each pixel made up of RGB data by a demosaicing processing section within the basic image processing section 109a. Specifically, data not at that pixel is obtained by interpolation from around that pixel position, and converted to RGB data. However, in the case where RAW data is already in the same format as RGB data (such as RAW data set that has been acquired from a Foveon sensor), demosaicing processing does not need to be carried out.

Once the microcomputer 121 has carried out demosaicing processing, color reproduction processing is carried out (S87). In this step, a linear transformation to multiply the image data by a color matrix coefficient according to the set white balance mode is carried out by a color reproduction processing section within the basic image processing section 109a, to correct the color of the image data. The color matrix coefficient is stored in the flash memory 125, and so it is read out and used.

Once the microcomputer 121 has carried out color reproduction processing, brightness change processing is carried out (S89). In this step a gamma table stored in the flash memory 125 is read out by a gamma processing section within the basic image processing section 109a, and gamma correction processing is carried out on the image data. After gamma conversion with RGB and color conversion to YCbCr, further gamma conversion is carried out with Y.

Figure 5A:
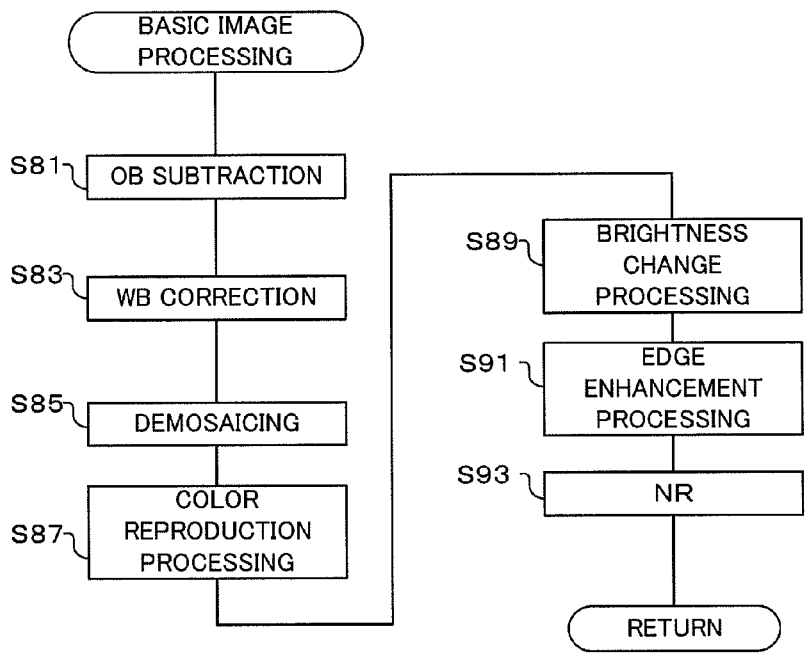
FIG. 5A is a flowchart showing operation of basic image processing of the camera of one embodiment of the present invention.
Figure 5B:
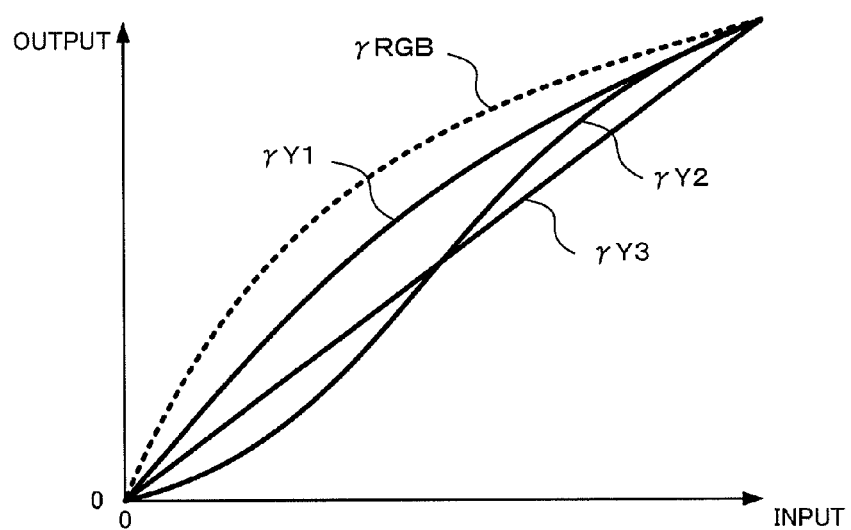
FIG. 5B is a graph showing an example of RGB gamma and Y gamma for image processing.

FIG. 5B shows one example of RGB gamma and Y gamma in the brightness change processing of step S89. In FIG. 5B, γRGB is one example of RGB gamma, and may be changed depending on the picture mode. γY1 is one example of Y gamma for a case where fantastic focus has been set as an art filter. γY2 is one example of Y gamma for a case where pop art or toy filter has been set as an art filter. γY3 is one example of Y gamma for another case.

The gamma of γY3 is a substantially straight line, while γY1 rises rapidly for a low input value, with change becoming more gradual for high input value. By contrast, the gamma of γY2 rises gently for a low input value, with change becoming larger for high input value. In this way, with this embodiment, in the brightness change processing of the basic image processing gamma is made different so as to become optimum gamma depending on the art filter (special effect processing) that has been set.

Once the microcomputer 121 has carried out gamma conversion processing in step S89, edge enhancement is carried out (S91). In this step, an edge enhancement processing section within the basic image processing section 109a enhances edges of the image data, by extracting edge components, for image data that has been subjected to gamma correction, using a band pass filter, multiplying by a coefficient corresponding to a degree of edge enhancement, and adding to the image data.

The microcomputer 121 next carries out NR (noise removal) (S93). In this step an image is subjected to frequency analysis, and processing is carried out to reduce noise in accordance with frequency. Once noise removal processing has been carried out, the originating processing flow is returned to.

Figure 6:
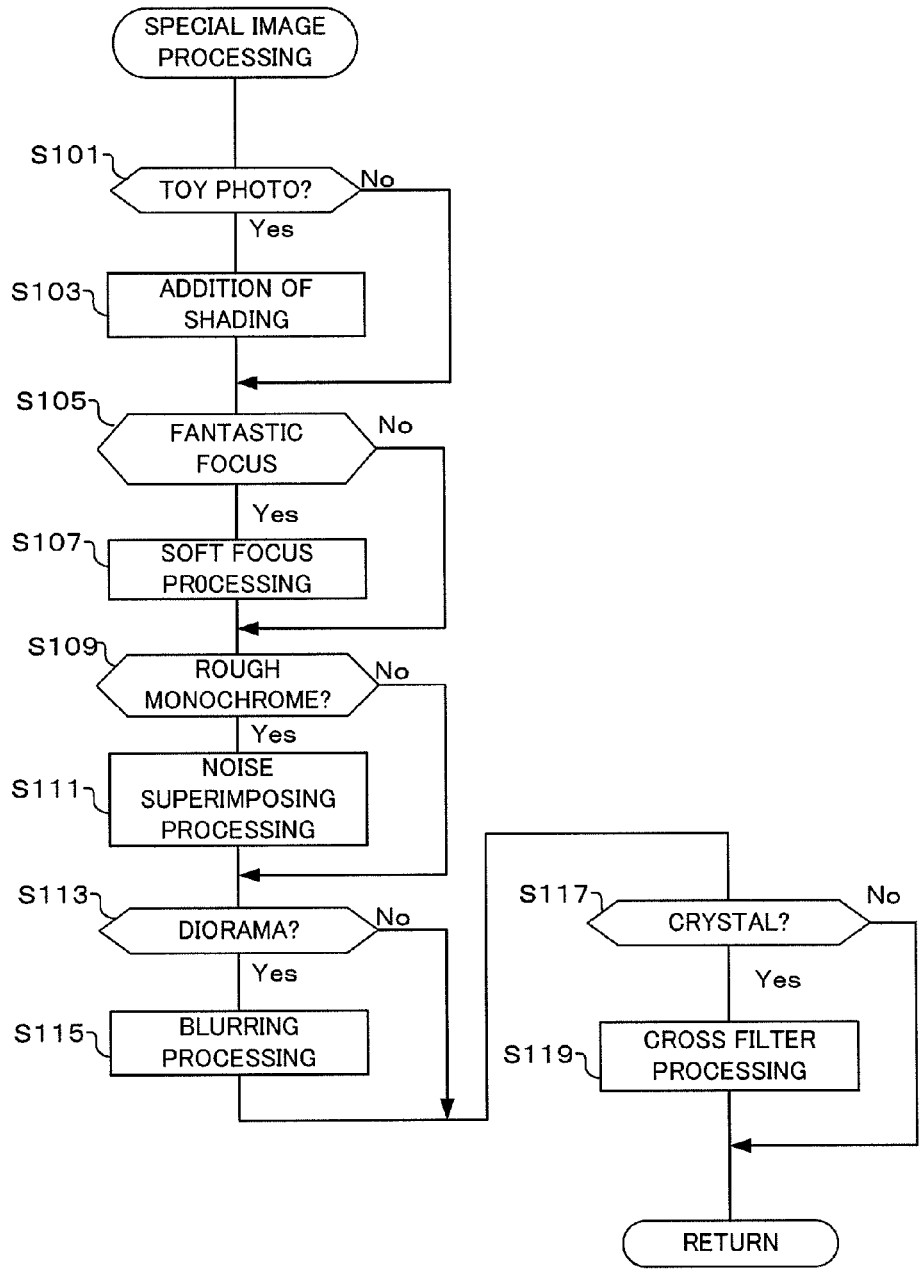
FIG. 6 is a flowchart showing operation of special image processing for the camera of the first embodiment of the present invention.

Next, detailed operation of the special image processing in step S75 (FIG. 4) will be described using the flowchart shown in FIG. 6.

If the flow for special image processing is entered, the microcomputer 121 first determines whether or not toy photo has been set as an art filter mode (S101). If the result of this determination is that toy photo has been set, a shading effect is added (S103). Here, the special image processing section 109b applies a shading effect to the periphery of the image by creating a gain map (gain values are one or less), such that brightness is gradually lowered in accordance with distance from the center of the image, and multiplying each pixel by a gain corresponding to the pixel.

If the microcomputer 121 has carried out shading addition, or if the result of determination in step S101 was not toy photo, it is determined whether or not fantastic focus has been set as the art filter mode (S105). If the result of this determination is that fantastic focus has been set, soft focus processing is carried out (S107). Here, the special image processing section 109b blurs an original image, and combines this blurred image and an image before blurring at a specified ratio (for example, a ratio of blurred:before blurring=2:3).

If soft focus processing has been carried out by the microcomputer 121, or if the result of determination in step S105 was not fantastic focus, it is next determined whether or not rough monochrome has been set as the art filter mode (S109). If the result of this determination is that the rough monochrome has been set, noise superimposing processing is carried out (S111). Here, noise addition processing is applied to the image data by the special image processing section 109b. Noise addition processing is processing to add a previously created noise pattern image to the subject image. It is also possible to create a noise pattern image based on a random number etc.

If noise superimposing processing has been carried out by the microcomputer 121, or if the result of determination in step S109 was not rough monochrome, it is next determined whether or not Diorama has been set as the art filter mode (S113). If the result of this determination is that Diorama has been set, blurring processing is carried out (S115). Here, the special image processing section 109b carries out gradual blurring processing of the original image above and below, or to the left and right, or in accordance with distance from, a center of an AF target.

If blurring processing has been carried out by the microcomputer 121, or if the result of determination in step S113 was not Diorama, it is next determined whether or not Crystal has been set as the art filter mode (S117). If the result of this determination is that Crystal has been set, cross filter processing is carried out (S119). Here, the special image processing section 109b detects a bright point from within an image, and with this bright point as a center draws a cross shape or cross pattern, which is an effect for creating a shiny effect on a plurality of radial shapes.

If cross filter processing has been carried out by the microcomputer 121, or if the result of determination in step S117 was that crystal was not set, the flow for special image processing is terminated, and the originating flow is returned to.

Next, detailed operation of the combined photograph creation in step S79 (FIG. 4) will be described using the flowchart shown in FIG. 7. As was described previously, with the flow for image processing shown in FIG. 4, first of all basic image processing is carried out, then special image processing is carried out, and finally this combined photograph creation is carried out. With this combined photograph creation, images are combined in a predetermined style (template). As a style the screen may be divided vertically and horizontally to give areas, or may be set appropriately in accordance with the photographers preference from a plurality of styles.

If the microcomputer 121 enters the combined photograph creation flow, image analysis is first carried out (S121). An original image (replacement image) to be combined is analyzed, and image features (for example brightness distribution, color distribution etc.) are acquired. It is also possible to perform analysis using an image for which image processing such as basic image processing has already been completed, or to perform analysis on raw data constituting the original image.

Once the microcomputer 121 has carried out image analysis, color change is carried out (S123). Here, the combined photograph processing section 117 corrects CbCr so that images to be combined become substantially the same color. At this time processing is carried out using data for each frame image region, but the processing does not update data within a frame image region R1 of the SDRAM 127. This is in order to save data later in an MPO format.

As a color change correction method, for example, CbCr of an image is offset so that a peak of color distribution (distribution on the CbCr plane) for all images to be combined becomes an average value of each peak. This correction method will be described using FIG. 8D and FIG. 8I. FIG. 8D shows color difference (Cb) for image 1 and image 2, while FIG. 8G shows color difference (Cr). For image 1 and image 2 respectively, if color difference is offset such that distribution peak becomes an average value (refer to FIG. 8E and FIG. 8H), the color of both images will become substantially the same (refer to FIG. 8F and FIG. 8I).

Once the microcomputer 121 has carried out color change in step S123, brightness change is carried out (S125). Here, correction is performed so that images to be combined by the combined photograph processing section 117 become of the same brightness. As a correction method, for example, correction is performed so that average values for each image are substantially matched to an average value for brightness distribution of all images to be combined. At this time if conversion is carried out with brightness gamma (gamma for only a luminance component), color would appear unnatural in the case where brightness was changed significantly. It is therefore possible, for example, to perform gamma correction with RGB color space after RGB conversion.

An example of brightness change will be described using FIG. 8A-FIG. 8C. FIG. 8A shows brightness of image 1 and image 2. They are both subjected to table conversion in RGB color space (refer to FIG. 8B). As will be understood from FIG. 8A, image 2 has a lot of low brightness components overall, and the low brightness side is raised up as a result of table conversion. After conversion, as shown in FIG. 8C, image 1 and image 2 have substantially the same brightness distribution.

Once the microcomputer 121 has carried out brightness change in step S125, combination is carried out (S127). Here, the combined photograph processing section 117 combines each image on a background image. Specifically, a combined photograph is created by carrying out combination by embedding images at each position of a predetermined style (template).

Once the microcomputer 121 has carried out combination in step S127, a special effect is applied (S129). Here, a special effect such as shading or blurring is added to an image that has been combined. A special effect was added to each image in step 75 of FIG. 4, and in this step a special effect is added to a combined image.

Once the microcomputer 121 has added the special effect in step S129, image storage is carried out and then the originating flow is returned to.

In this way, in the flow for combined photograph creation, after color change and brightness change have been carried out for images (S123, S125), images for a combined photograph are combined (S133), and image storage is carried out (S137). Since adjustment is carried out for a plurality of images so that color and brightness become the same, a combined photograph that has an appearance of overall unity is created.

Figure 9:
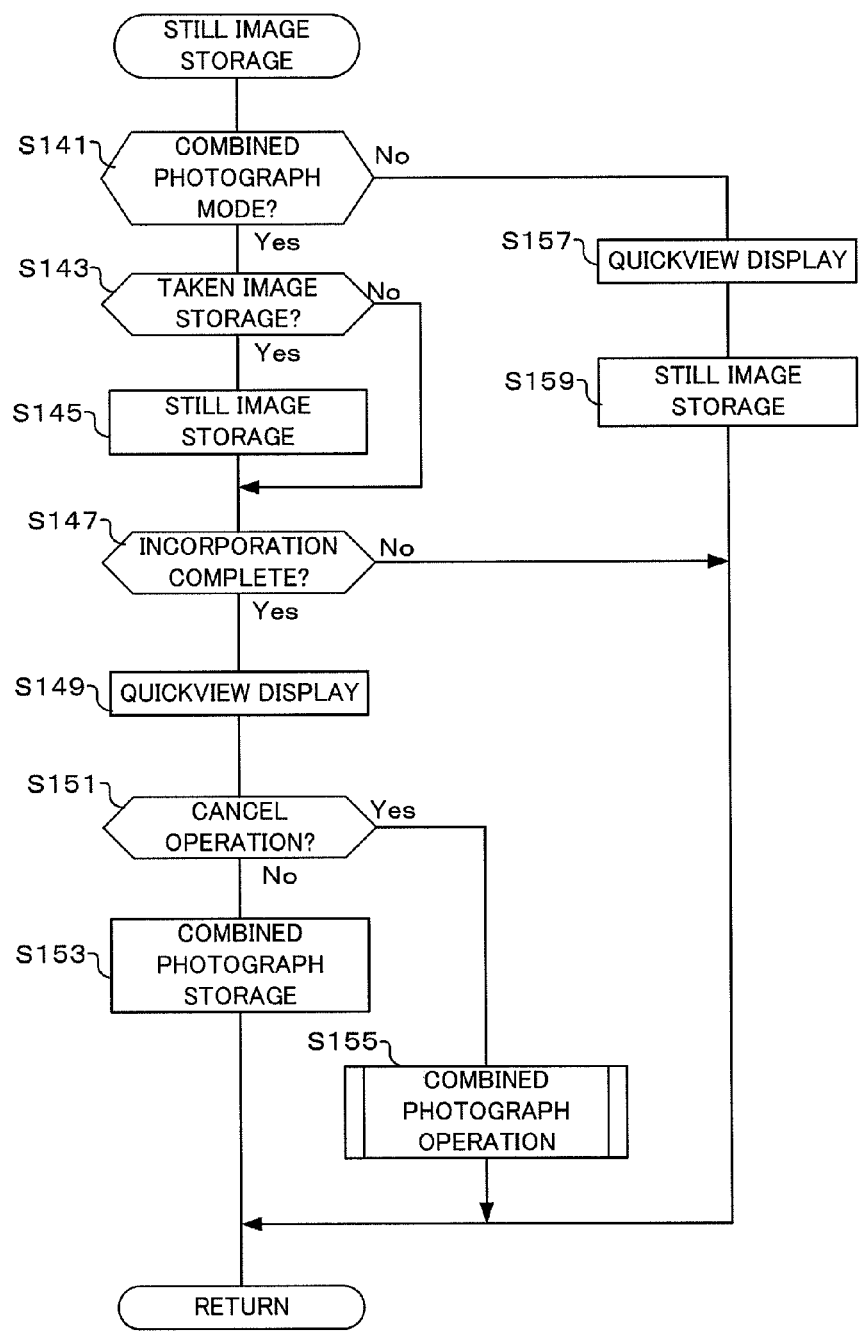
FIG. 9 is a flowchart showing operation of still image storage for the camera of the first embodiment of the present invention.

Next, detailed operation of the still picture storage in step S43 (FIG. 3) will be described using the flowchart shown in FIG. 9. This still picture storage performs processing in order to shoot an image using the previously described mechanical shutter (S39), subsequently execute image processing (S41), and then store the image data that has been subjected to image processing in the storage medium 131.

If the microcomputer 121 enters the flow for still picture storage, it is first determined whether or not it is combined photograph mode (S141). If the result of this determination is that it is not combined photograph mode, it is normal mode, and Quickview Display is carried out (S157). This Quickview display is a function to display an image stored in the storage medium 131 temporarily on the display panel 135 or the EVF 153 for a specified time. In this way it is possible for the user to confirm taken images.

Once the microcomputer 121 has carried out Quickview display, still image storage is carried out (S159). Besides a combined photograph, images that have been subjected to image processing are subjected to JPEG compression and stored in the storage medium 131. However, this is not limited and it is also possible to store in an uncompressed format (for example TIFF etc.), or to use another compression format. It is also possible to store RAW images.

If the result of determination in step S141 is that it is combined photograph mode, the microcomputer 121 determines whether or not to perform taken image storage (S143). With combined photograph mode, each image is embedded in a predetermined style (template), but even when combined photograph mode has been set, images that are not embedded within the style may also be stored. In this step, it is determined whether or not the user has turned on a setting for whether or not to store each frame of the combined photograph, in the camera setting of step S9 in FIG. 2.

If the result of determination in step S143 is taken image storage, the microcomputer 121 carries out still picture storage (S145). Here, similarly to step S159, a picture is taken as a single taken image, and not a combined photograph, subjected to compression etc. using JPEG or the like, and stored in the storage medium 131.

Once still picture storage has been carried out in step S145, or if the result of determination in step S143 was not taken image storage, the microcomputer 121 next determines whether or not combining is complete (S147). Here, a number of images that satisfies a style that has been set in advance are taken, and it is determined whether or not they have been combined. For example, with a combined photograph that is made up of four images, four photographs are taken, and it is determined whether or not they have been combined. Also, in a case of combining four images, it is also determined that incorporation is complete in a case where two images are taken, and two images are selected from stored images.

If the result of determination in step S147 was incorporation complete, Quickview Display is carried out by the microcomputer 121 (S149). Here, after completion of all images as a combined photograph, this combined photograph is subjected to Quickview Display on the display panel 135. During Quickview Display, similarly to the flow for playback, which will be described later, magnified display is also possible.

Once Quickview Display has been carried out by the microcomputer 121, it is next determined whether or not there has been a cancel operation (S151). There may be situations where the user is considering deleting some photographs and replacing them, when looking at the Quickview Display. Therefore, with this embodiment, in the case where Quickview Display is carried out and a cancel operation is performed within a specified time (for example, three seconds), a designated frame is canceled, and shooting can be carried out again. As a cancel operation, it is possible to perform designation on a touch panel, or to cancel using a delete button.

If the result of determination in step S151 is that the cancel operation has been carried out, a combined photograph operation is carried out by the microcomputer 121 (S155). Within a subroutine for the combined photograph operation, a cancel operation is executed (refer to S165-S173 in FIG. 10, which will be described later).

On the other hand, if the result of determination in step S151 is that a cancel operation has not been performed, combined photograph storage is carried out (S153). Here, combined image data for a completed combined photograph is stored in the storage medium 131.

If combined photograph storage was carried out in step S153, or if a combined photograph operation was carried out in step S155, or if the result of determination in step S147 was not incorporation complete, or if still picture storage was carried out in step S159, the microcomputer 121 returns to the originating processing flow.

In this way, in the still picture storage flow, combined photograph storage is not carried out until a number of images determined by the style have been assembled (S147→No), and storage of a combined photograph is carried out once the number of images have been assembled (S153). Also, even after completion of a combined photograph it is possible to cancel an image of the combined photograph that has been designated by carrying out a cancel operation (S151).

Figure 10:
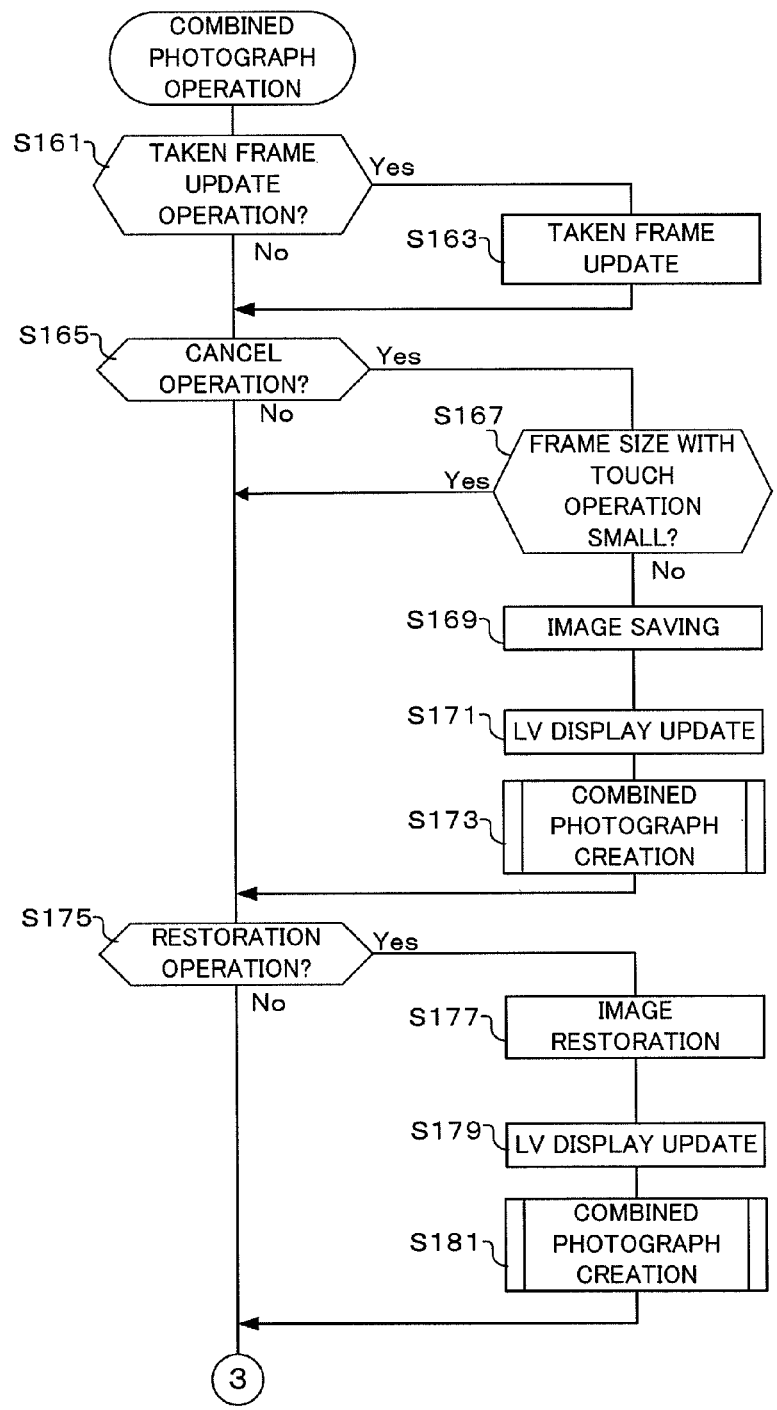
FIG. 10 is a flowchart showing operation of combined photograph creation of the camera of the first embodiment of the present invention.

Next, detailed operation of the combined photograph operation of step S23 (FIG. 2) and step S155 (FIG. 9) will be described using the flowcharts shown in FIG. 10 and FIG. 11. As described previously, this combined photograph operation is executed when various operations are carried out in order to carry out editing of the combined photograph.

If the flow for combined photograph operation is entered, the microcomputer 121 first determines whether or not a taken frame update operation has been carried out (S161), and if the result of this determination is that a taken frame update operation has been performed update of a taken frame is carried out (S163). Which frame a taken image is embedded within in a combined photograph style can be changed as appropriate. In the case where an operation to update a frame that will be taken has been performed by operation of a cross-shaped key or OK button or a touch panel operation etc., a frame to be taken is updated. At this time, in order to make known which frame is being taken, it is possible to display a border on the frame, display an icon, display frames other than the taken frame darkly, or reduce the intensity of frames other than the taken frame. In the case where a frame is touched during live view display, a release operation (first and second, or first only) is executed to take a picture. In the case where live view display is being carried out with the plurality of frames, a frame to be taken is selected using the release button.

If update of a taken frame has been carried out in step S163, or if the result of determination in step S161 was that an update operation for a taken frame was not carried out, the microcomputer 121 next determines whether or not a cancel operation was performed (S165). As was described for the flow for still picture storage, there are situations where some images making up a completed combined photograph are deleted, or it is desired to replace with a separate image. With this embodiment, therefore, a frame that has been taken can be canceled by selecting the taken frame using the cross-shaped key and performing an operation of pressing the delete button, or by performing a drag and drop operation of the taken frame to a trash bin icon on the touch panel. In this step S165 it is determined whether or not either of these operations has been performed.

If the result of determination in step S165 is that a cancel operation has been performed, the microcomputer 121 next determines whether or not frame size of a touch operation is small (S167). In the case where a cancel operation has been carried out by touch operation, it is determined whether or not the size (horizontal and vertical size, or area) of a frame that should be canceled is small (for example, having an area of 1 $cm^2$ or less). This is because if the frame size is small it may result in an erroneous operation at the time of performing a touch operation with a finger.

If the result of determination in step S167 is that the size of a frame that has been subjected to a touch operation is larger than a specified value, the microcomputer 121 then carries out image saving (S169) and update of live view display (S171). Even in the case where an image has been deleted as a result of a cancel operation, there may be cases where it is desired to restore that image. Therefore, in order to be able to carry out restoration of the image (specifically in order to undo a cancel operation), a taken image that has been designated for deletion (image of a frame of the combined photograph) is saved in a separate region within temporary memory, and live view display is updated with that frame appearing in an untaken state.

Once the microcomputer 121 has carried out live view display, combined photograph creation is carried out (S173). The subroutine for this combined photograph creation will be described using FIG. 7. Since an image that has been designated by a cancel operation has been deleted, in this step the combined photograph is created again using remaining images.

If combined photograph creation has been carried out in step S173, or if the result of determination in step S167 was that the frame size with a touch operation was small, or if the result of determination in step S165 was that a cancel operation was not performed, the microcomputer 121 next determines whether or not there has been a restoration operation (S175). A restoration operation is carried out in accordance with operation of the operation section 123 or the touch panel 123*a*, in cases such as when a frame it is desired to restore is selected using the cross-shaped key and a cancel button is operated, or when a trash bin icon is dragged and dropped to a frame it is desired to restore using a touch operation.

If the result of determination in step S175 is that there was a restoration operation, then next the microcomputer 121 restores an image (S177), and performs update of live view display (S179). Here, a saved image is returned to the original position, and live view display is updated with the appearance that that frame has been taken.

Once the microcomputer 121 has carried out update of live view display, combined photograph creation is carried out (S181). The subroutine for this combined photograph creation will be described using FIG. 7. Since an image that was designated by the restoration operation has been restored, in this step the combined photograph is created again also including the restored image.

Figure 11:
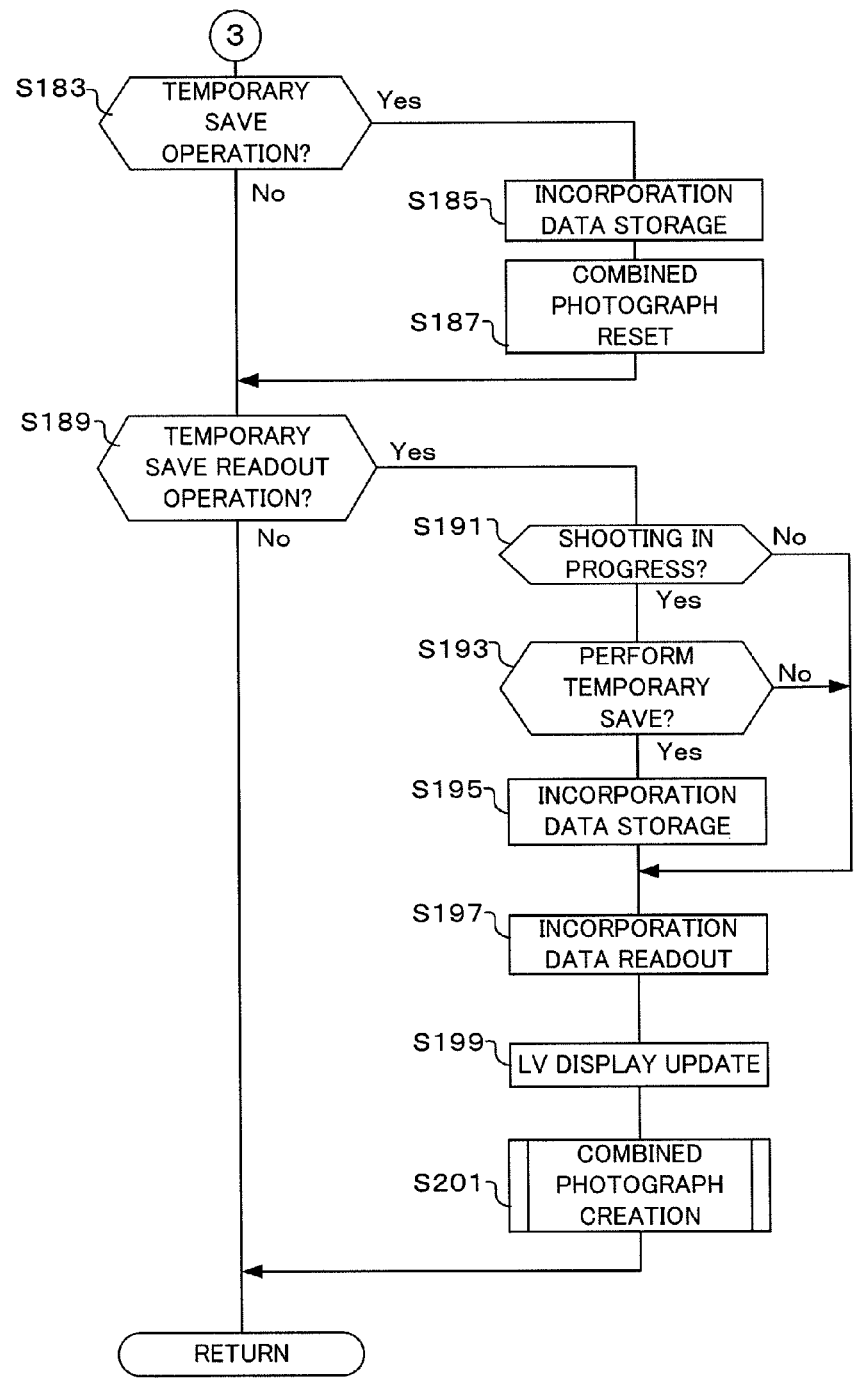
FIG. 11 is a flowchart showing operation of combined photograph creation of the camera of the first embodiment of the present invention.

If combined photograph creation has been carried out in step S181, or if the result of determination in step S175 was that a restoration operation was not performed, the microcomputer 121 next determines whether or not there has been a temporary storage operation (S183 in FIG. 11). In the case where there have been a plurality of exposures in a short time and creation of a combined photograph is performed, shooting can be carried out continuously. However, in the case of creating a combined photograph using images that were taken at time intervals, such as in the morning, in the daytime, and at nighttime, it is convenient to be able to temporarily save images during creation of the combined photograph. With this embodiment, therefore, it is possible to temporarily save images that make up the combined photograph. As a restoration operation, operations such as selecting a temporary save menu and selecting an icon are carried out using a menu screen or touch panel operation etc.

If the result of determination in step S183 is that there has been a temporary save operation, the microcomputer 121 stores incorporated data (S185). Here, the state of a currently combined photograph, specifically what photographs have been taken for which style etc., is stored in the flash memory 125 or the storage medium 131. As incorporated data that is stored, there are at least information relating to a style (template), taken photograph data, and relational information for the photograph data and the template.

If storage of incorporated data has been carried out, the microcomputer 121 next carries out combined photograph reset (S187). After storage, information on the combined photograph that has been taken is reset to give a state that is the same as for the first exposure, namely a state where live view display and the SDRAM 127 have been reset etc.

If the reset of the combined photograph has been carried out in step S187, or if the result of determination in step S183 was that a temporary save operation was not performed, it is next determined whether or not there has been a temporary save read operation (S189). In the case where incorporated data for a combined photograph has been temporarily saved in steps S183 and S185, this operation is the reading out of this temporarily saved incorporated data. As the operation, a temporary save read menu or icon selection operation are carried out on a menu screen or touch panel.

If the result of determination in step S189 is that there has been a temporary save read operation, it is next determined whether or not shooting is in progress (S191). There may be situations where a temporary save read operation is performed while a picture is being taken in combined photograph mode. In this case, since it is necessary to temporarily interrupt the shooting currently taking place in combined photograph mode, this is handled in steps S191-S195. In this step, it is determined whether or not there is shooting in combined photograph mode, and at least one image has been taken for the template.

If the result of determination in step S191 is that shooting of a combined photograph is in progress, whether or not to perform a temporary save is confirmed (S193). In this case, the confirmation screen for whether or not to temporarily save this current state of the shooting progress is displayed on the display panel 135, as a query to the user. If the result of this determination is to perform temporary save, storage of the incorporated data is carried out (S195). Here, the same incorporated data as in step S185 is stored in order to temporarily save the current state.

If incorporated data storage has been carried out in step S195, or if the result of determination in step S193 was not to perform temporary save, or if the result of determination in step S191 was that shooting was not in progress, the microcomputer 121 next reads out the incorporated data (S197), performs live view display (S199), and carries out combined photograph creation (S201). Here, incorporated data that was temporarily saved in step S185 is read out, update to live view display similar to that in step S171 and step S179 is carried out, and creation of a combined photograph similar to that in step S173 and step S181 is carried out.

If creation of a combined photograph has been carried out in step S201, or if the result of determination in step S189 was that a temporary data readout operation was not carried out, operation of the combined photograph operation is completed and the originating flow is returned to.

¥ In this way, in the flow for combined photograph operation, it is possible to update a frame to be taken among frames of a style (S163), and it is possible to delete and restore a frame (S169, S177). Further, even during combined photograph shooting, it is possible to temporarily save data, and it is possible to read out this temporarily saved data, and continue with combined photograph shooting.

Next, detailed operations of the image processing and live view display in step S55 (FIG. 3) will be described using the flowchart shown in FIG. 12. This image processing and live view display performs single frame live view display on the EVF 153 or combined photograph live view display on the display panel 135, after image processing for live view display has been carried out.

If the microcomputer 121 enters the flow for combined photograph operation, it is first determined whether or not it is EVF display (S211). Here, whether or not to display on the EVF 153 that functions as the second display section is determined in accordance with output from the EVF display sensor 155. As described previously, the EVF display sensor 155 is provided close to the EVF 153, and if the photographer gets close to the eyepiece of the EVF 153 a detection signal is output from the EVF display sensor 155. In the event that this detection signal is detected, EVF display is determined. With this embodiment, display/non-display of the EVF 153 is switched based on the detection output from the EVF display sensor 155, but it is also possible to have the EVF 153 always displaying.

If the result of determination in step S211 is to carry out EVF display, at least one frame is taken and it is determined whether or not to carry out confirmation of already taken frame images (S213). Here, the number of already taken frames is one or more, and it is determined whether or not the photographer has performed an operation to confirm a frame. With this embodiment, it is possible to update images incorporated into the combined photograph during live view display. In the case where the photographer performs this update, a dial within the operating section 123 is rotated, or an operation member such as the cross-shaped key is operated. With this embodiment, therefore, there is a function for, in the case where a dial or operating member such as the cross shaped key has been operated, confirming other already taken frame images for a specified time.

If the results of determination in step S123 is that that there is at least one frame and that there was a frame confirmation operation, the microcomputer 121 next determines whether or not there is a confirmation frame update operation (S215). Here, determination as to operating direction and rotation amount of a dial, and if either cross-shaped key was operated, is carried out, and an update operation is determined.

If the result of determination in step S215 is that there was an update operation, frame update is carried out (S217). Here, a frame is switched to display another frame for a single frame in the order of a frame position and a shooting order in accordance with an update operation using an operation member. Display of an updated frame image is carried out in step S223.

If frame update has been carried out in step S217, or if the result of determination in step S215 was that an update operation was not performed, the microcomputer 121 next reads out a basic image for the frame image (S219). A taken image is subjected to basic image processing (refer to FIG. 5A), and subjected to special image processing in the event that art filter or the like has been set. In this step, for image data of a taken image of a frame that is selected, image data that has only been subjected to basic image processing is read out from the SDRAM 127. In the case where taken images are not stored in the SDRAM 127, only frame portions of images incorporated into a combined photograph are read out.

If the result of determination in step 213 is that at least one frame has not been taken, that is, there has not yet been any shooting in combined photograph mode, or if frame confirmation is not carried out, basic image processing is carried out (S233). Here, the basic image processing that was described using FIG. 5A is applied to image data that is obtained by the image sensor 103. Image data that has been subjected to basic image processing may be stored in the SDRAM 127. With this embodiment, basic image processing is carried out to give a natural final result, but it is also possible to apply other processing, and it is also possible to apply special image processing.

If basic image processing has been carried out in step S233, or if a basic image for a frame image has been read out in step S219, mask setting is next carried out (S221). In the case of creating a combined photograph, depending on designated position of the style (template) all portions of a selected frame are not displayed. Therefore, in the case of displaying an image of a single frame on the EVF 153, a mask is set such that a region incorporated or a region not incorporated in a combined photograph can be distinguished clearly by applying semi-transmissive gray or achromatic (monotone processing,) or blurring processing to a region not to be incorporated.

Figure 14A:
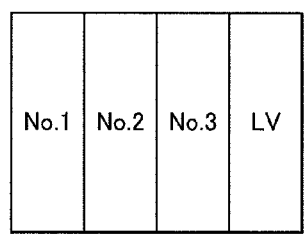
FIG. 14A-FIG. 14D are drawings showing an example of masks for outside of a region for incorporation, for EVF display, with the camera of the first embodiment of the present invention.
Figure 14B:
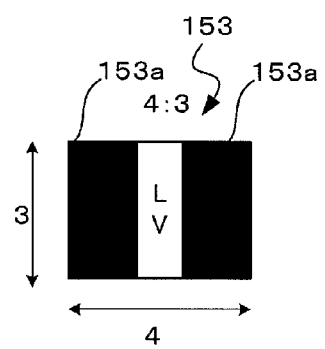

For example, the style (template) shown in FIG. 14A is made up of four vertically elongated images (No. 1-No. 3, LV). In the drawing, LV represents a live view image, and No. 1 to No. 3 represent incorporated images that have already been selected. Aspect ratio of the taken images is 4:3, but with the example shown in FIG. 14A only a part of an image is incorporated. Therefore, as shown in FIG. 14B, image processing is carried out to cover areas that are not incorporated with a black mask 153*a*.

Figure 14C:
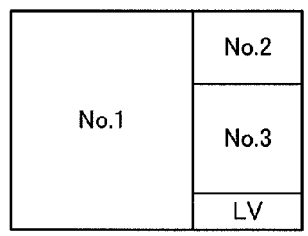
Figure 14D:
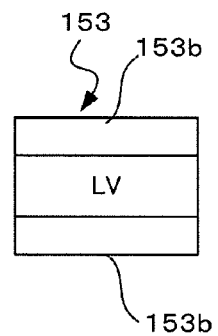

Also, with the example shown in FIG. 14C a style (template) is made up of incorporated images (No. 1-No. 3) and a live view image LV. In this case also, aspect ratio of LV is different to the aspect ratios of the taken images, and so it is made possible for areas that are not incorporated to be recognizable by the photographer. Specifically, image processing is applied so that areas that are not incorporated are covered by a mask 153*b* that is monotone or blurred, and a live view image of portions that are to be incorporated is displayed in color.

In this way, in display of a live view image, image processing is applied so as to cover with masks 153*a*, 153*b* in accordance with an aspect ratio determined according to the style of the combined photograph. The photographer therefore intuitively knows portions that are incorporated in the combined photograph and portions that are not incorporated, and can easily carry out framing that is best suited to the combined photograph. There is also the advantage that if portions that are not to be incorporated are covered with a monotone or blurred mask 153*b*, it is possible to grasp the surroundings of portions that are to be incorporated with no interference on shooting.

Once the microcomputer 121 has carried out mask setting in step S221, EVF display is carried out next (S223). Here, for a frame image that was updated in step S217, or a live view image that was subjected to basic image processing in step S233, and image that has had mask setting applied in step S221 is displayed on the EVF 153. Icon display is performed on the image in order to know whether it is a live view image or an already read-out image. Also, at the time of confirming a taken frame, it is possible to display so as to differentiate between a case where an image that has only been subjected to basic image processing is stored in the SDRAM 127, or a case where an image is not stored.

Figure 13A:
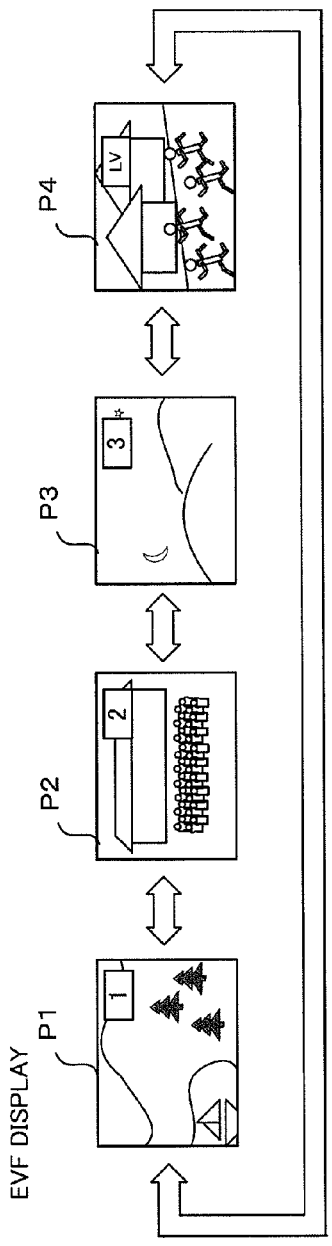
FIG. 13A is a drawing showing EVF display switching with the camera of the first embodiment of the present invention.

An example of this EVF display is shown in FIG. 13A. Images P1-P3 are images that have already been selected as images incorporated in a combined photograph, and "1", "2" and "3" are displayed as image numbers. Also, image P4 is a live view image and an icon "LV" is displayed to indicate this fact. Images P1-P4 are switched in accordance with the update operation in step S15 described previously.

Once the microcomputer 121 has carried out EVF display in step S223, or if the result of determination in step S211 was not EVF display, it is determined if movie storage is in progress or if display panel display is in progress (S225). Here, determination as to whether or not movie storage is in progress is carried out based on the storage in progress flag (refer to steps S13-S19 in FIG. 2). Also, whether or not to display on the display panel 135 is determined to be Yes, for example, when there is no display on the EVF 153. It is also possible to always display on the display panel 135.

If the result of determination in step S225 is that movie storage is in progress, or if there is display on the display panel 135, image processing is carried out (S227). Here, the image processing shown in FIG. 4 is carried out. In this image processing, basic image processing, special image processing and combined photograph processing are applied. In the event that combined photograph mode has been selected, combined photograph processing is applied to images being incorporated and a live view image.

Figure 4:
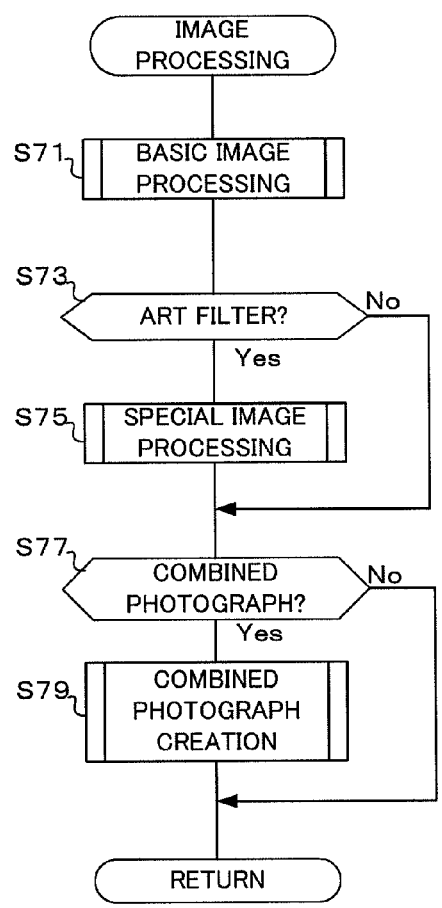
FIG. 4 is a flowchart showing operation of image processing for the camera of the first embodiment of the present invention.

Also, the microcomputer 121 carries out basic image processing in order to perform single frame live view display on the EVF 153 (S233), and also carries out basic image processing in the case of combined photograph live view display on the display panel 135 (S227, S7 in FIG. 4). However, the basic image processing for single frame live view display and the basic image processing for combined photograph live view display are carried out with different parameters. For example, for single frame live view display, natural parameters are set, while for combined photograph live view display parameters set so as to obtain a feeling of unity for a plurality of images.

If the image processing is applied in step S227, it is next determined whether or not there is display panel display (S229). Here, it is determined whether or not to display on the display panel 135 using the result of determination of step S225.

If the result of determination in step S229 is display on the display panel, display on the display panel 135 is carried out by the microcomputer 121 (S231). Here, the image that was subjected to the image processing in step S227 is displayed on the display panel 135. In the event that combined photograph mode has been set, combined photograph processing is applied to read out images and a live view image, and this image is displayed.

Figure 13B:
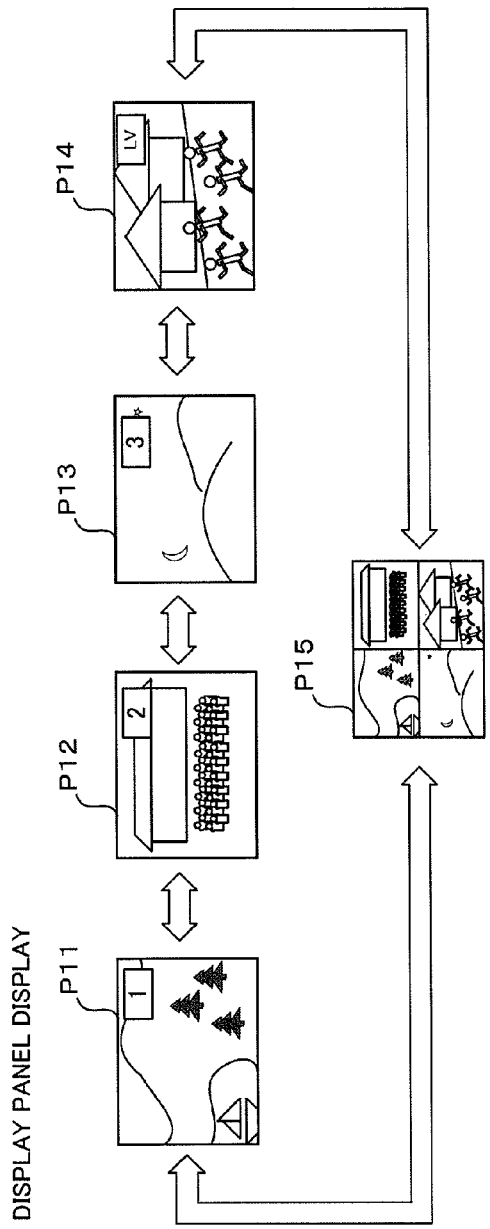
FIG. 13B is a drawing showing TFT display switching with the camera of the first embodiment of the present invention.

An example of this display panel display is shown in FIG. 13B. Images P11-P13 are images that have already been selected as images incorporated in a combined photograph, and "1", "2" and "3" are displayed as image numbers. Also, image P14 is a live view image and an icon "LV" is displayed to indicate this fact. Image P15 is an image of a combined photograph, with combined photograph processing being applied to images P11-P14 and an image that has a sense of unity being displayed. Points of difference from the images P1-P4 in FIG. 13A are that with images P1-P4 of FIG. 13A combined photograph processing is not applied, while the combined photograph processing is applied to images P11-P15 of FIG. 13B and image processing having a sense of unity is applied.

If there has been display on the display panel in step S231, or if the result of determination in step S225 was that movie storage was in progress or that there was no display panel display, or if the result of determination in step S229 was that there was no display panel display, then the microcomputer 121 terminates the flow for image processing and live view display, and the originating flow is returned to.

In this way, in the image processing for live view display of this embodiment, a single frame live view image is displayed on the EVF 153 (S223), while a combined photograph is displayed on the display panel 135 (S227, S231). Also, in the display of the combined photograph, an image that has been subjected to combined photograph processing also using a live view image that was acquired by the image sensor 103 is displayed (P14, P15 in FIG. 13B).

Also, a single frame live view image is not partial expansion of a combined photograph, and image processing that is different to a combined photograph (some image processing of the image processing carried out with a combined photograph) is applied. Also, a single frame live view image is subjected to mask display at places that are not incorporated into the combined photograph (refer to S221, FIG. 14B). Also, a frame that has already been taken cab be confirmed with a simple operation by displaying a single frame.

By carrying out control as has been described above, with this embodiment it is possible to observe single frame live view display on the EVF 153, and it is possible to observe a combined image using combined photograph live view display on the display panel 135, which means the photographer can shoot in a preferred shooting style.

Also, since incorporation positions of a combined photograph are displayed, it is possible to prevent taken images being incorporated at unexpected positions. Also, special image processing and combined photograph processing are applied to image data, and a combined photograph having a sense of unity can be observed at the time of live view display, which means that a finished photograph can be imagined, and shooting of a combined photograph is made simple.

Further, with single frame live view display, since an image that has been subjected to basic image processing is displayed on the EVF 153, it is possible to concentrate more on shooting without any extra effects that may be distracting. During shooting with a single frame also, since it is possible to easily confirm already taken frames it is possible to shoot taking into account the balance with other frames using the EVF 153. In particular, since the EVF 153 has a small screen size, it is possible to concentrate on shooting by displaying only a single frame Next, a modified example of operation for image processing and live view display will be described using FIG. 15. With the image processing and live view display shown in previously described FIG. 12, except for cases where at least one frame is taken and there is no frame confirmation, basic image processing (S233) was carried out. Conversely, with this modified example, not only basic image processing but also image analysis, color change, brightness change etc. are carried out.

Figure 12:
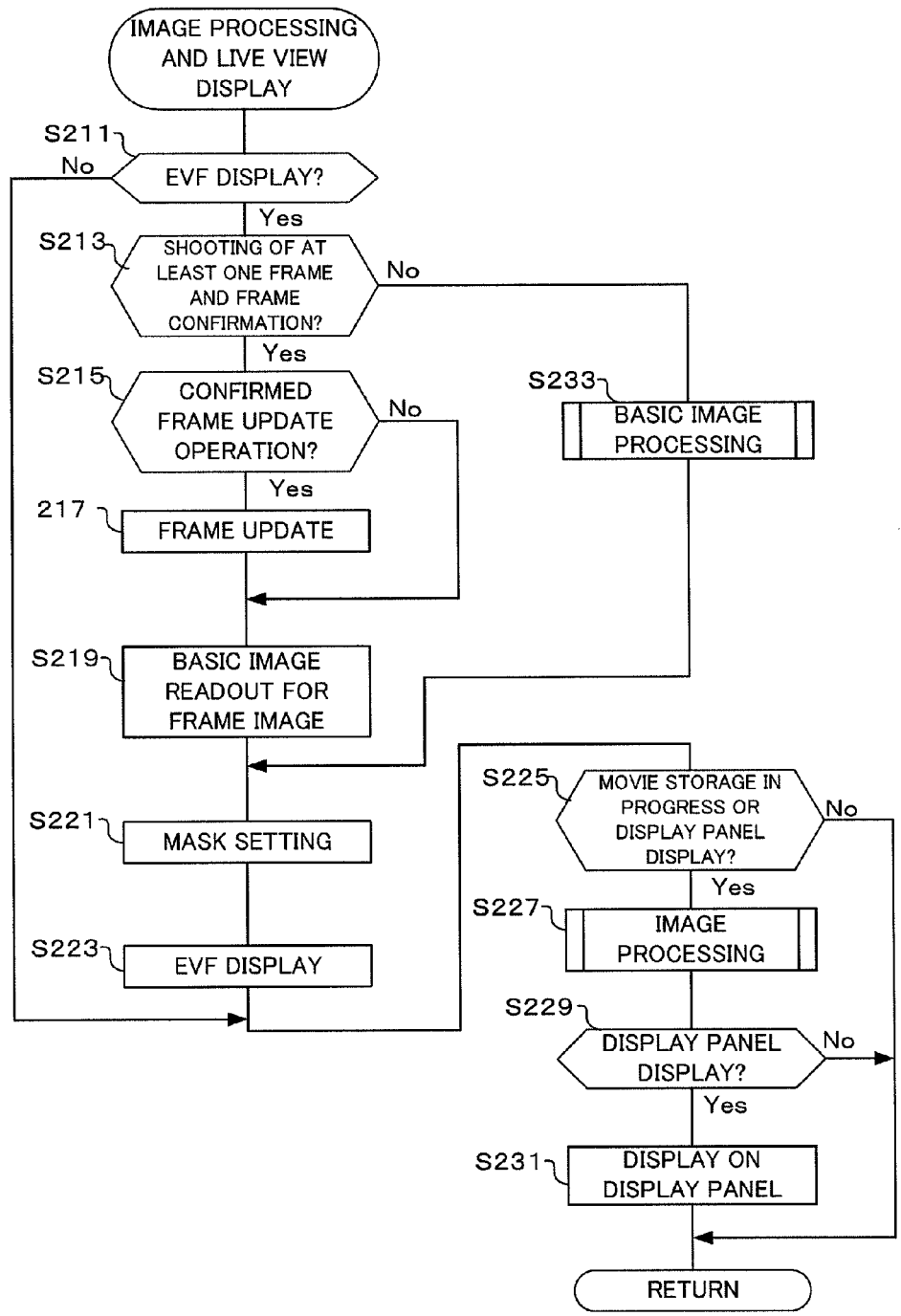
FIG. 12 is a flowchart showing operation of image processing and live view display for the camera of the first embodiment of the present invention.
Figure 15:
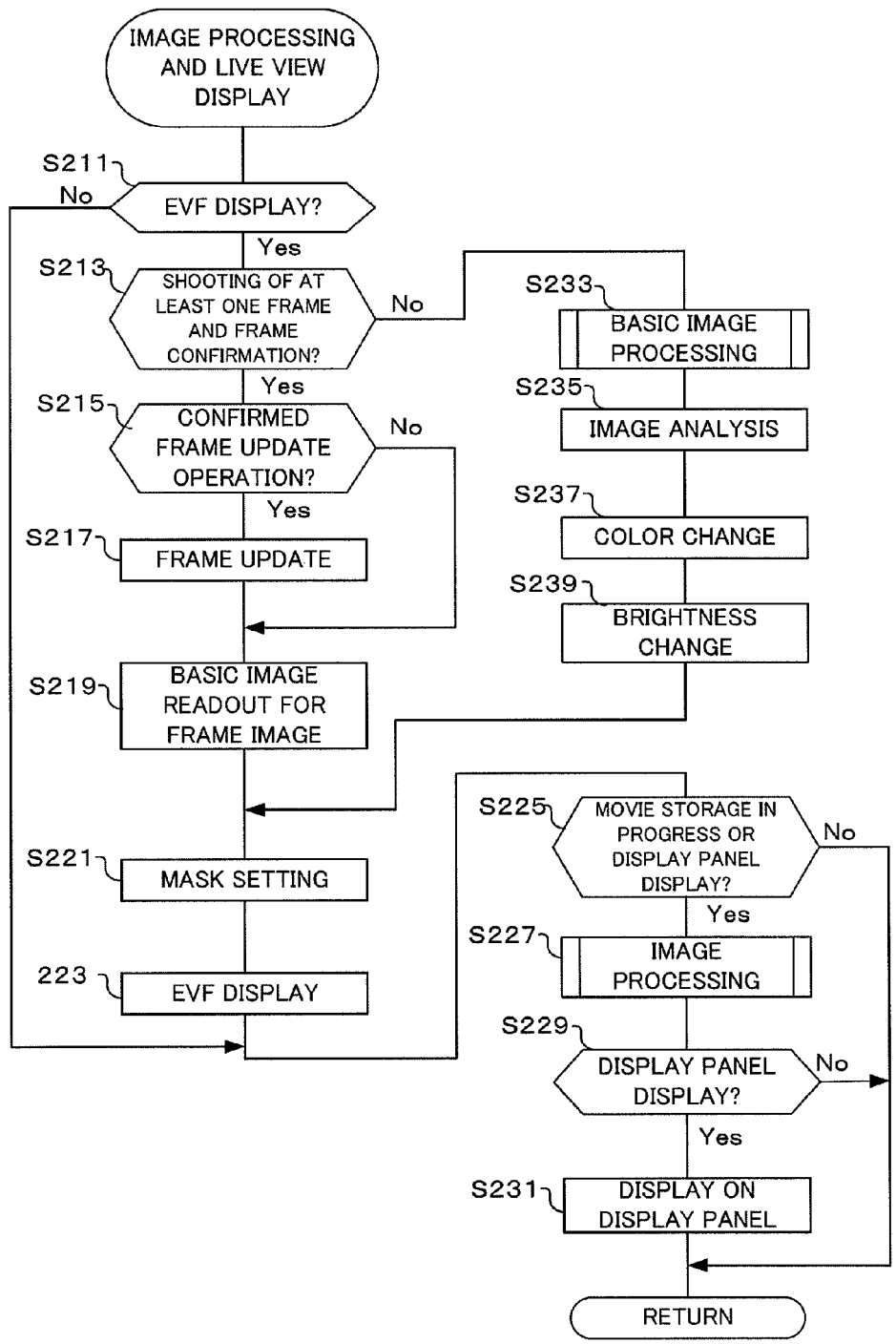
FIG. 15 is a flowchart showing a modified example of operation of image processing and live view display for the camera of the first embodiment of the present invention.

A modified example of the flowchart for image processing and live view display shown in FIG. 15 differs from the flowchart of FIG. 12 in that steps S235-S239 have been added, but other steps are the same as FIG. 12.

Also, the image analysis of step S235, the color change of step S237 and the brightness change of step S239 respectively carry out the same processing as in steps S121, S123 and S125 respectively in FIG. 7, and so detailed description will be omitted.

In this way, in the image processing and live view display of this modified example, in addition to the basic image processing color change and brightness change are carried out. The processing here is image processing for carrying out live view display of a single frame, and so special effect processing is not applied. Special effect distracts the photographer from concentrating on shooting, and so is not carried out. Processing related to color reproduction, such as color change on brightness change, is carried out because it affects the final finish.

Next, a second embodiment of the present invention will be described using FIG. 16 to FIG. 19. With the first embodiment, the EVF 153 was built into the inside of the camera body 100, but with the second embodiment there is an external EVF. Also, with the first embodiment, a single display panel 135 functioning as a first display section was arranged on the camera body 100, but with this embodiment two display panels are arranged in the camera body 100.

Figure 16:
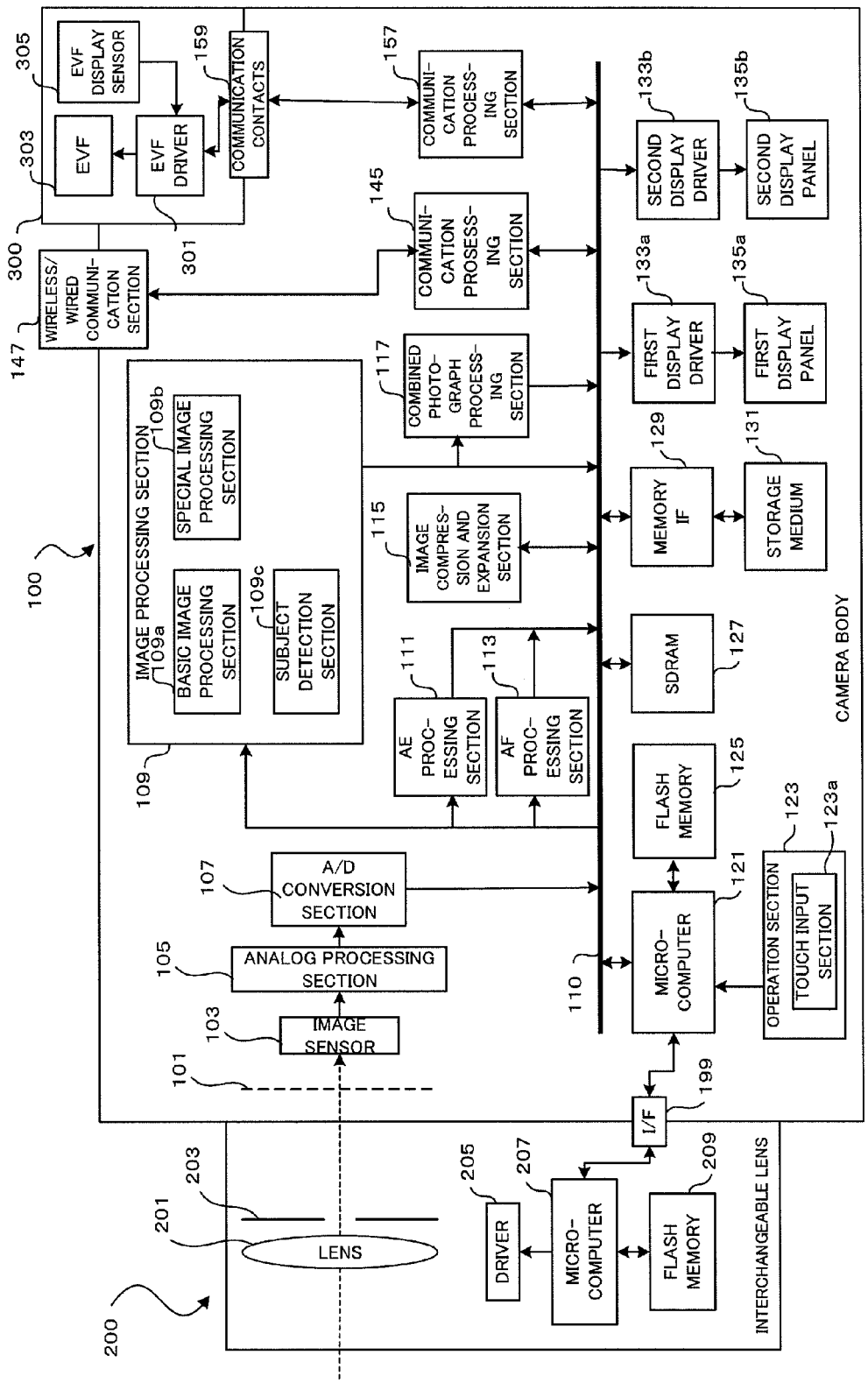
FIG. 16 is a block diagram mainly showing the electrical structure of a camera of a second embodiment of the present invention.

FIG. 16 is a block diagram mainly showing the electrical structure of a camera of the second embodiment of the present invention. Compared to FIG. 1 relating to the first embodiment, FIG. 16 differs in that the external EVF 300 is provided, communication contacts 159 are provided for carrying out communication with the camera body 100, and further a first display driver 133a, a first display panel 135a, a second display driver 133b, and a second display panel 135b are provided, but other than this it is the same as FIG. 1. Description will therefore concentrate on points of difference.

The display drivers 133a and 133b are respectively connected to the display panels 135a and 135b, and similarly to the case of the first embodiment, an image is displayed based on image data that has been read out from the SDRAM 127 or the storage medium 131. It is possible to have Quickview display, and playback display of image files for still images and movies, and also movie display such as live view display, on the display panels 135a and 135b. It is also possible to display a combined photograph that has been subjected to combined photograph processing in the combined photograph processing section 117. As a display panel, similarly to the first embodiment, it is possible to adopt a liquid crystal display panel (LCD) or organic EL etc. The arrangement of the first and second display panels 135a and 135b will be described later using FIG. 17A-FIG. 17D, and FIG. 18A-FIG. 18E.

The external EVF 300 can be attached to and detached from the camera body 100, and at the time of attachment is capable of connection to the communication processes section 157 within the camera body 100 by means of the communication contacts 159. Also, the EVF 300 is capable of receiving image data from the camera body 100 and displaying images.

Internally, the EVF 300 comprises an EVF driver 301, an EVF 303, and an EVF display sensor 305. The EVF driver 301 is connected to the EVF 303, and an image is displayed on the EVF 303 based on image data that has been input by means of the communication contacts 159. With the EVF 303 it is possible to observe an image of a display section by means of the eyepiece.

Next, an example of the external appearance of a camera of this embodiment will be described using FIG. 17A-FIG. 17D. FIG. 17A and FIG. 17B are a first example, and FIG. 17C and FIG. 17D are a second example.

In the first example of the external appearance of the camera, the external EVF 300 can be attached on an upper portion of the camera body 100. This external EVF 300 functions as a second display section. Also, two display panels, namely the first display panel 135a on the second display panel 135b functioning as a first display section, are provided on the camera body 100.

The second display panel 135b is a display panel that is fixed to the camera body 100, while the first display panel 135a is a movable panel. Specifically, the first display panel 135a is rotatably attached to the camera body 100 by means of a hinge 161, so as to rotate about the two axes as shown in the drawing.

In FIG. 17A, display of the first display panel 135a and the second display panel 135b is possible simultaneously by opening out the first display panel 135a. In this case, the first display panel 135a is further from the optical axis 163 of the photographing lens 201, while the second display panel 135b is closer to the optical axis 163. In this state, live view display of a single frame is carried out on the second display panel 135b that is closer to the optical axis 163, and an image of a combined photograph is displayed in live view on the first display panel 135a that is further from the optical axis 163. In this way, images are displayed on both the first and second display panels 135a and 135b, but since it is easier to carry out fine adjustments at the time of shooting on the display that is closest to the optical axis 163, single frame live view display is carried out on the second display panel 135b, where it is made possible to see the fine detail in a single frame.

FIG. 17B is a state where the second display panel 135b is covered by the first display panel 135a, and the display surface of the first display panel 135a is facing outwards. In this state, single frame live view display is carried out on the first display panel 135a.

In this way, with the first example of this embodiment live view display of a single frame and live view display of a combined photograph are switched depending on the states of the display surfaces of the first display panel 135a and the second display panel 135b. Also, similarly to the case of the first embodiment, an image that has not been subjected to combined photograph processing is displayed in single frame live view display, and an image that has been subjected to combined photograph processing is displayed in combined photograph live view display.

With the second example of the external appearance of the camera shown in FIG. 17C and FIG. 17D, two display panels, namely the first display panel 135a and the second display panel 135b, are provided on the camera body 100. Specifically, the first display panel 135a is arranged on the rear surface of the camera body 100, while the second display panel 135b is provided on the front surface.

With this second example, the external EVF 300 is omitted, and live view display of a combined photograph is performed on the first display panel 135a, while live view display of a single frame is performed on the second display panel 135b. Specifically, the first display panel 135a functions as a first display section, and the second display panel 135b functions as a second display section.

With this second example, since live view display of a single frame is performed on the front surface of the camera body, it is convenient when the photographer is taking a picture of themselves. When taking a picture of oneself, since the distance from the photographer to the camera body 100 is far it is difficult to see even if an image of a combined photograph is displayed on the second display panel 135b, and so only live view display of a single frame is performed. Similarly to the case of the first embodiment, an image that has not been subjected to combined photograph processing is displayed in single frame live view display, and an image that has been subjected to combined photograph processing is displayed in combined photograph live view display.

A Modified example of the external appearance of the camera of the second embodiment of the present invention will now be described using FIG. 18A to FIG. 18D. With the example shown in FIG. 17A-FIG. 17D, they were two display panels, namely the first display panel 135a and the second display panel 135b, but with the example shown in FIG. 18A-FIG. 18D there is only one display panel.

With the first example of the modified example shown in FIG. 18A and FIG. 18B, the first display panel 135a is fixed to the camera body 100, and an external EVF 300 is detachable. With this example, live view display of a single frame is carried out on the external EVF 300, and display of a combined photograph is performed on the first display panel 135a. Regarding the image at the lower right of FIG. 18A, live view is not displayed in this portion since live view is being displayed on the EVF 300. In order to make the photographer or people other than the photographer aware of this fact, a black image is displayed, and also identifying displays of "LV" and "EVF" are performed.

With the second example of the modified example shown in FIG. 18C-FIG. 18E, the external EVF 300 is omitted, and the first display panel 135a is rotatable with respect to the camera body 100. In the state shown in FIG. 18C, the display surface of the first display panel 135a is facing outwards, and so it is possible to observe a displayed image. In this state, combined photograph live view display is carried out. In this state, it is also possible to carry out single frame live view display using a switching operation etc.

From the state of FIG. 18C, if the first display panel 135a has an upper portion pulled out as shown in FIG. 18D, and then the upper portion is turned as shown in FIG. 18E, it is possible to observe the display surface of the first display panel 135a from the front surface of the camera body 100. In this case, similarly to the case of FIG. 17C, this gives a state most suited to the photographer taking a picture of themselves. Live view display for a single frame is then carried out.

In the modified examples shown in FIG. 18A-FIG. 18E also, an image that has not been subjected to combined photograph processing is displayed in single frame live view display, and an image that has been subjected to combined photograph processing is displayed in combined photograph live view display.

Figure 19:
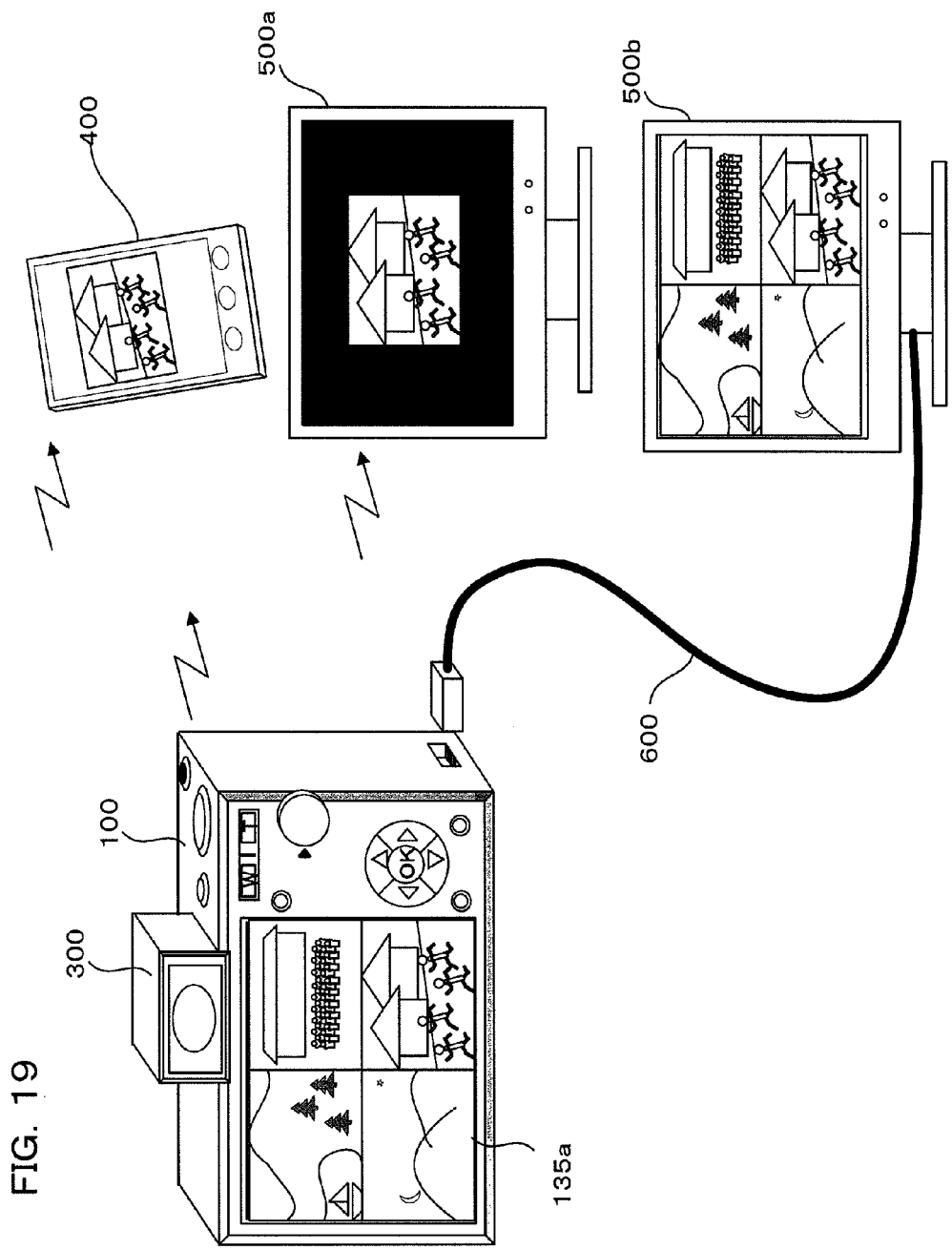
FIG. 19 is a drawing showing an example of connection between the camera of the second embodiment of the present invention and peripheral devices.

Next, a modified example of connection to a peripheral device, with this embodiment, will be described using FIG. 19. With this modified example, it is possible to connect to a smartphone 400 and televisions 500a, 500b by means of the wireless/wired communication section 147.

The smartphone 400 and the camera body 100 carryout exchange of data wirelessly via the wireless/wired communication section 147. Since the smartphone 400 can also be used as a remote control for the camera body 100, single frame live view display is carried out on the display section of the smartphone 400, and the position of the photographer is confirmed. It is also possible to transmit a plurality of still images in installments, and create an image for a combined photograph in the smartphone 400.

Also, the televisions 500a and 500b exchange data using wireless signals or wired signals by means of the wireless/wired communication section 147. In the case of wired signals, connection is made to the television 500b using a HDMI cable 600. In this case an image for a combined photograph is transmitted since the bandwidth is wide. Also, in the case of wireless signals, since the transmitted image data capacity is limited, only a single frame live view image is transmitted to the television 500a.

In this way, the camera body 100 and peripheral devices such as a smartphone 400 and televisions 500a, 500b are connected, and it is possible to selectively transmit a single frame live view image and an image for a combined photograph.

Figure 20A:
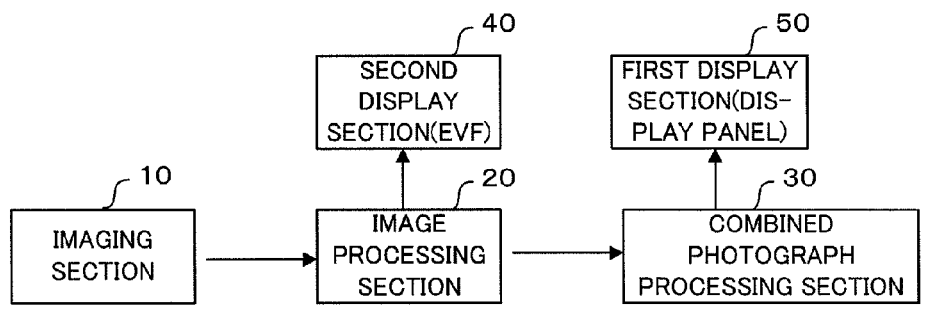
FIG. 20A and FIG. 20B are drawings for describing the outline of first to third embodiments of the present invention.

The flow of data at the time of live view display for the above described embodiment and modified examples of the present invention will now be described using FIG. 20A. Image data output from the imaging section 10 (corresponding to the image sensor 103 in FIG. 1) is subjected to image processing for single frame live view display by the image processing section 20 (corresponding to the image processing section 109 in FIG. 1), and single frame live view display is performed on the second display section (corresponding to the EVF 153 in FIG. 1) based on this image processed image data.

Also, image data from the image processing section 20 is subjected to image processing for combined photograph live view display by the combined photograph processing section 30 (corresponding to the combined photograph processing section 117 in FIG. 1). Combined photograph live view display is carried out on the first display section 50 (corresponding to the display panel 135 in FIG. 1) based on image data that has been image processed by the image processing section 20. With the image processing section 20, image processing for single frame live view display and image processing for combined photograph live view display may be different.

Figure 20B:
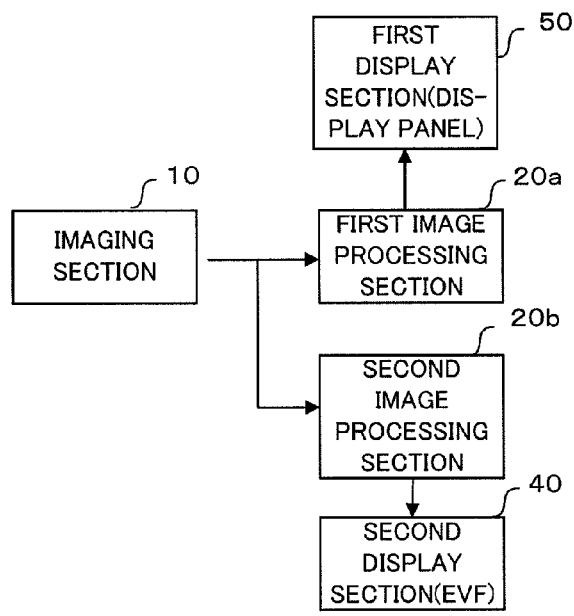

As shown in FIG. 20B, the image processing section 20 may be divided into a first image processing section 20a and a second image processing section 20b. Specifically, the first image processing section 20a input with image data from the imaging section 10 outputs image data that has been subjected to basic image processing, special image processing and combined photograph processing to the first display section 50, and carries out combined photograph live view display. Also, the second image processing section 20b input with image data from the imaging section 10 outputs image data that has been subjected to basic image processing to the second display section 40, and carries out single frame live view display.

As has been described above, in each of the embodiments and each of the modified examples of the present invention, in the case of displaying a live view image on the first display section (display panel 135 etc.), an image that has been processed by the combined photograph processing section 117 is displayed (refer to S227 and S231 in FIG. 12, and S79 in FIG. 4). On the other hand, in the case of displaying a live view image on the second display section (EVF 153 etc.), an image that has been image processed by the image processing section 109 is displayed (refer to S233 and S223 in FIG. 12). It is therefore easy to observe display of a single frame and display of a combined photograph.

Also, with each of the embodiments and each of the modified examples of the present invention, the image processing section carries out different image processing for the case where an image to be displayed on the first display section (display panel 135 etc.) is created, and the case where an image to be displayed on the second display section (EVF 153 etc.) is created. For example, in the case of creating an image to be displayed on the first display, the images are created naturally. This means that optimal image processing is respectively carried out at the time of combined photograph live view display and at the time of single frame live view display.

Also, with each of the embodiments and each of the modified examples of the present invention, the image processing section carries out image processing for creating an image to be displayed on the second display section (EVF 153 etc.), and carries out special image processing for inputting an image that has been subjected to image processing by the image processing section, and creating an image to be displayed on the first display section (display panel 135 etc.) is carried out. It is therefore possible, with single frame live view display, to display an image that has not been subjected to special image processing and is close to the original image, and with combined photograph live view display to display an image to which set special effects have been applied. Also, with each of the embodiments and each of the modified examples of the present invention, for the case where an image to be displayed on the second display section (EVF 153 etc.) is created, the image processing section carries out some of the image processing that is carried out for the case where an image to be displayed on the first display section (display panel 135 etc.) is created.

Also, with each of the embodiments and each of the modified examples of the present invention, for the case where an image to be displayed on the second display section (EVF 153 etc.) is created, the image processing section carries out some of the image processing that is carried out for the case where an image to be displayed on the first display section (display panel 135 etc.) is created, with different parameters. For example, in the case of creating an image to be displayed on the first display, image processing is carried out using parameters for a natural finish.

Also, with each of the embodiments and each of the modified examples of the present invention, the first display section (display panel 135 etc.) is a display section that is affected by external light, while the second display section (EVF 153 etc.) is a display section that is not affected by external light. It is therefore possible to concentrate on shooting with the second display section. Also, it is possible to use a large panel as the first display section, and it is possible to make it easy to observe combined photograph live view.

With each of the embodiments and each of the modified examples of the present invention, single frame live view is displayed on the EVF 153 and combined photograph live view is displayed on the display panel 135, but conversely it is also possible to display the single frame live view on the display panel 135 and display the combined photograph live view on the EVF 153.

Also, with each of the embodiments and each of the modified examples of the present invention, a device for taking pictures has been described using a digital camera, but as a camera it is also possible to use a digital single lens reflex camera, mirrorless camera or compact digital camera, or a camera for movie use such as a video camera, and further to have a camera that is incorporated into a mobile phone, smartphone, mobile information terminal (PDA: Personal Digital Assistant), game console etc. In any event, it is possible to adopt the present invention as long as it is an imaging device is capable of shooting combined photographs.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, capable of shooting a combined photograph that is a single image made up of a plurality of images, and that is capable of live view display, comprising:
    a first display section,
    a second display section that is different from the first display section,
    an imaging section for converting a subject image to image data and outputting the image data,
    an image processing section for subjecting the image data to image processing, and
    a combined photograph processing section, for combining at least one image that has been subjected to image processing by the image processing section and a live view image that has been repeatedly formed by the imaging section, and carrying out second image processing that is different to the image processing, to create a single image, wherein,
    when a live view image, repeatedly formed by the imaging section, is displayed on the first display section, an image that has been subjected to processing by the combined photograph processing section is displayed,
    when a live view image, repeatedly formed by the imaging section, is displayed on the second display section, an image that has been subjected to image processing by the image processing section is displayed; and
    the second image processing carried out by the combined photograph processing section carries out at least one image processing of color change so that a peak of color distribution of images to be combined becomes an average of peak values of images to be combined, or brightness change so that brightness distribution of images to be combined becomes an average value of images to be combined.

2. The imaging device of claim 1, wherein:
the image processing section carries out image processing to create an image to be displayed on the second display section, is input with an image that has been image processed by the image processing section, and carries out special image processing to create an image to be displayed on the first display section.

3. The imaging device of claim 1, wherein:
the image processing section carries out some of the image processing that is carried out for a case where an image to be displayed on the first display section is created, in a case of creating an image to be displayed on the second display section.

4. The imaging device of claim 1, wherein:
the image processing section carries out some of the image processing that is carried out for a case where an image to be displayed on the first display section is created, in a case of creating an image to be displayed on the second display section, with different parameters.

5. The imaging device of claim 1, wherein
the first display section is a rear display panel, and the second display section is an electronic viewfinder.

6. The imaging device of claim 1, wherein
the first display section is a display section that is affected by external light, and the second display section is a display section that is relatively unaffected by external light compared to the first display section.

7. The imaging device of claim 1, wherein:
the combined photograph processing section uses a template for setting a plurality of different images to arrange selected image data at designated positions of the template, and generates single image data.

8. An imaging method for shooting a combined photograph that is single image made up of a plurality of images, and carrying out live view display, comprising:
    converting a subject image to image data and outputting the image data;
    in a case where a live view image of a single frame, repeatedly formed by the imaging section, is displayed on a second display section, displaying an image obtained by subjecting the image data to image processing;
    combining at least one image data that has been subjected to the image processing and a live view image that has been repeatedly formed by the imaging section, and carrying out second image processing that is different to the image processing, to create a single image; and
    in the case where a live view image of a combined photograph, repeatedly formed by the imaging section, is displayed on a first display section that is different to the second display section, displaying the single image that has been generated by carrying out the second image processing that is different to the image processing as an image of this combined photograph;

wherein the second image processing carries out at least one image processing of color change so that a peak of color distribution of images to be combined becomes an average of peak values of images to be combined, or brightness change so that brightness distribution of images to be combined becomes an average value of images to be combined.

9. A non-transitory computer-readable medium storing a computer program, for shooting a combined photograph that is single image made up of a plurality of images, and carrying out live view display, to be executed on a computer, comprising:

converting a subject image to image data and outputting the image data;

in a case where a live view image of a single frame, repeatedly formed by the imaging section, is displayed on a second display section, displaying an image obtained by subjecting the image data to image processing;

combining at least one image data that has been subjected to the image processing and a live view image that has been repeatedly formed by the imaging section, and carrying out second image processing that is different to the image processing, to create a single image; and in the case where a live view image of a combined photograph, repeatedly formed by the imaging section, is displayed on a first display section that is different to the second display section, displaying the single image that has been generated by carrying out the second image processing that is different to the image processing as displaying an image of this combined photograph;

wherein the second image processing carries out at least one image processing of color change so that a peak of color distribution of images to be combined becomes an average of peak values of images to be combined, or brightness change so that brightness distribution of images to be combined becomes an average value of images to be combined.

* * * * *